(12) United States Patent
Yamanashi

(10) Patent No.: US 6,396,643 B1
(45) Date of Patent: May 28, 2002

(54) ZOOM LENS

(75) Inventor: Takanori Yamanashi, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/540,533

(22) Filed: Mar. 31, 2000

(30) Foreign Application Priority Data

Apr. 6, 1999 (JP) .......................................... 11-098958

(51) Int. Cl.⁷ .............................................. G02B 15/14
(52) U.S. Cl. ...................................... 359/692; 359/683
(58) Field of Search ................................ 359/692, 690, 359/687–688, 683

(56) References Cited

U.S. PATENT DOCUMENTS

| | | | |
|---|---|---|---|
| 5,825,557 A | | 10/1998 | Ohno .......................... 359/692 |
| 5,995,299 A | * | 11/1999 | Yoon .......................... 359/692 |
| 6,081,390 A | * | 6/2000 | Konno ........................ 359/689 |

OTHER PUBLICATIONS

Patent Abstracts of Japan, Jun. 1998, Pub. No. 10161025, Appln. No. 08334990, Nov. 1996, Kenichi Sato.

* cited by examiner

*Primary Examiner*—Jordan M. Schwartz
(74) *Attorney, Agent, or Firm*—Pillsbury Winthrop LLP

(57) ABSTRACT

The invention relates to a two-group zoom lens of +− construction, which, albeit having a high zoom ratio, is reduced in length not only at the wide-angle end but also at the telephoto end and has a low telephoto ratio at the telephoto end where the length of the system becomes longest. The zoom lens comprises a first lens group G1 having positive refracting power and a second lens group G2 having negative refracting power. For zooming from the wide-angle end to the telephoto end of the system, each lens group moves toward the object side while the spacing between the first and second lens groups G1 and G2 becomes narrow. Specific conditions for the focal length of the second lens group G2, the amount of movement of the second lens group G2 and the zoom ratio shared by the second lens group G2 are satisfied.

1 Claim, 16 Drawing Sheets

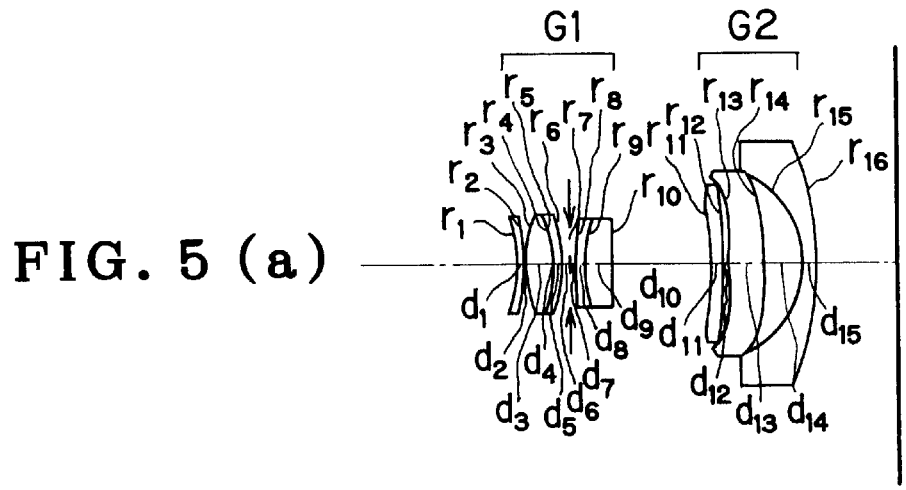
FIG. 5 (a)
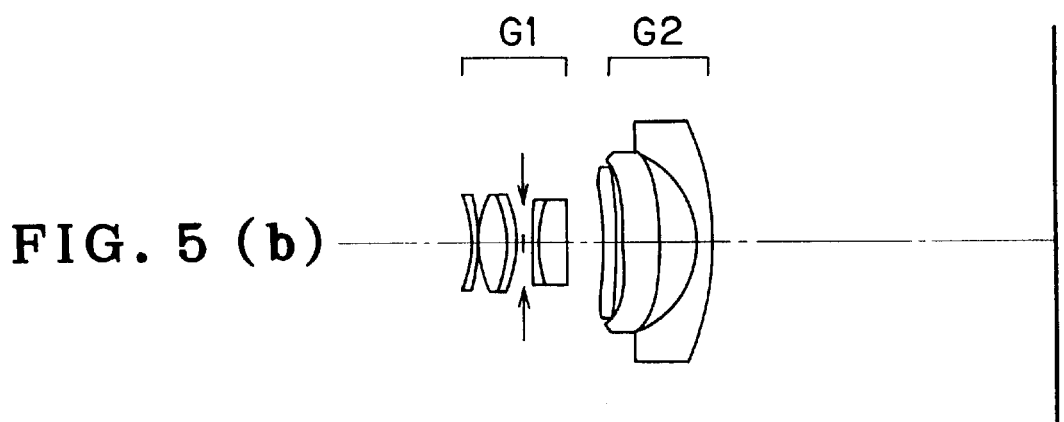
FIG. 5 (b)
FIG. 5 (c)
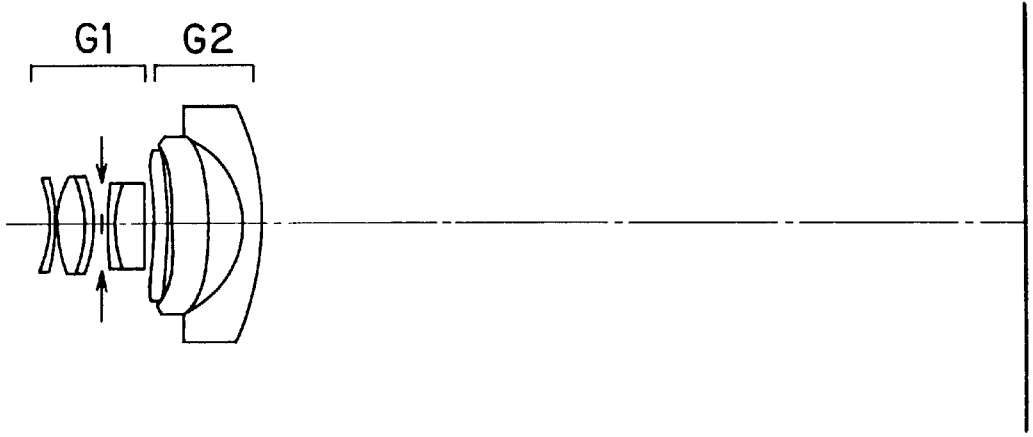

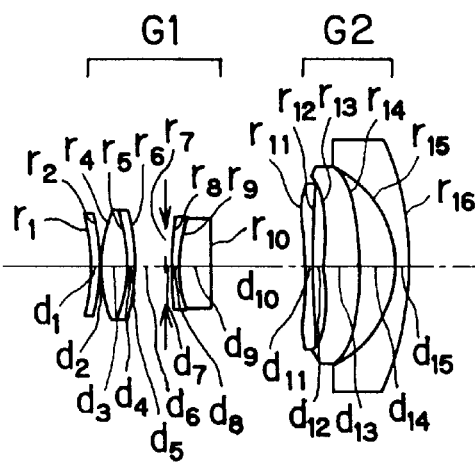
FIG. 8 (a)
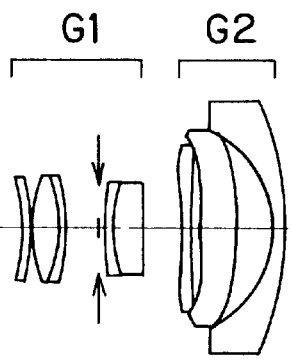
FIG. 8 (b)
FIG. 8 (c)
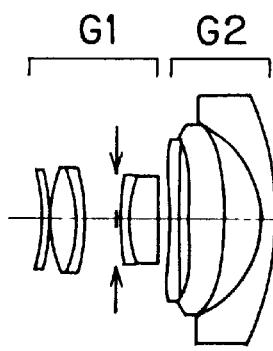

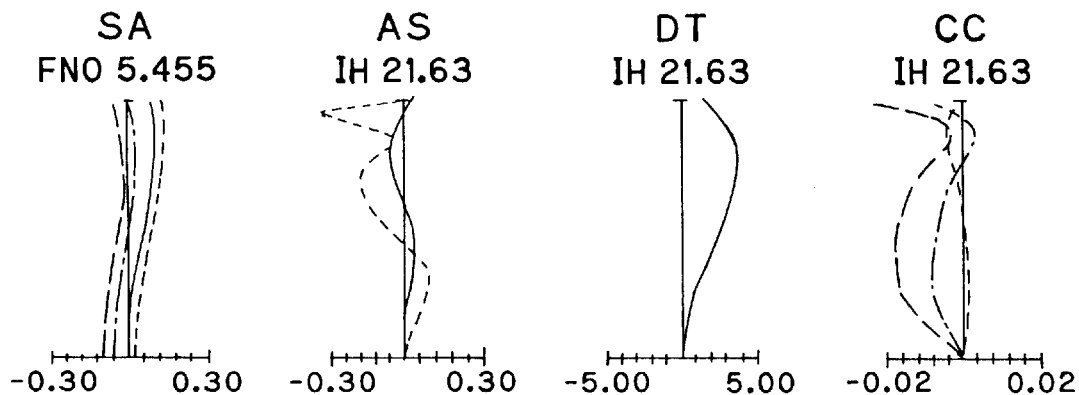
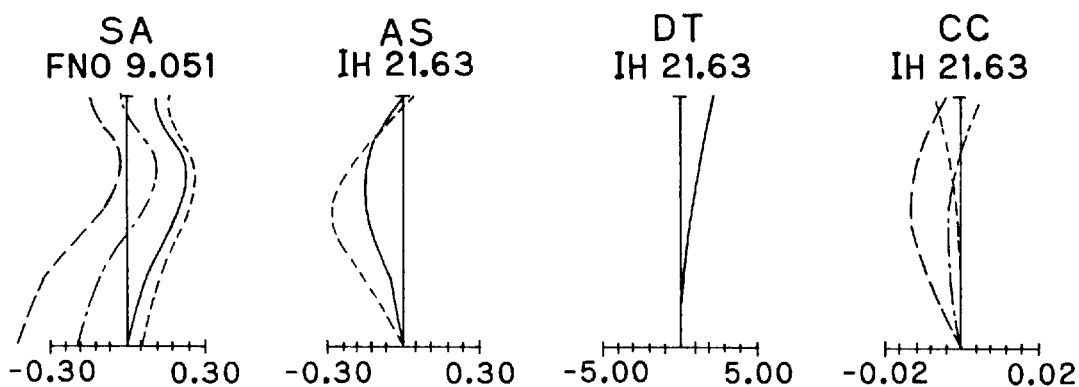
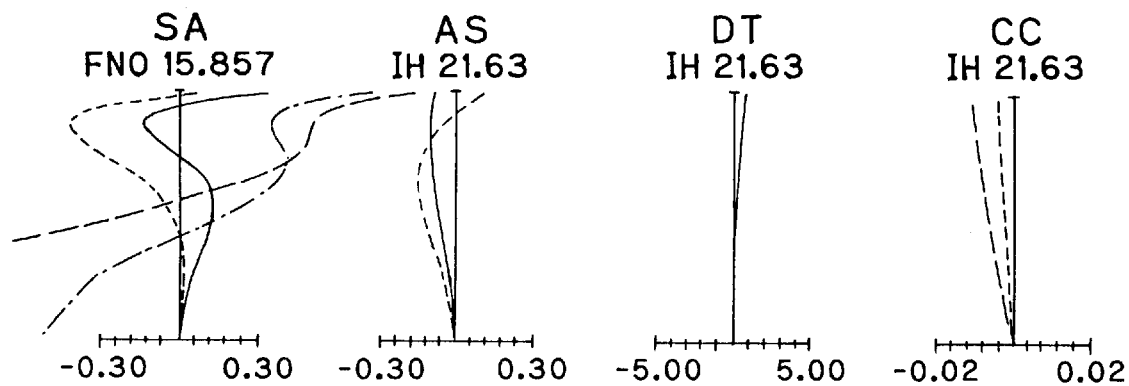

ZOOM LENS

BACKGROUND OF THE INVENTION

The present invention relates generally to a zoom lens, and more particularly to a two-group zoom lens system which is used on a compact camera for instance.

So-called zoom lenses for compact cameras have some considerable limitations imposed on their zoom ratios and aperture ratios. So far, two-group zoom lenses of simple construction having positive refracting power and negative refracting power have been known for those having a relatively low zoom ratio.

Such two-group zoom lenses, for instance, are disclosed in U.S. Pat. No. 5,825,557 and JP-A 10-161025. In one two-group zoom lens embodiment, a negative meniscus lens having concave on its object side is located on the side of the positive first lens group nearest to the object side and the negative second lens group comprises a negative, a positive and a negative lens.

In the state-of-the art in such two-group zoom lenses, however, the amount of movement of each lens group for zooming is still large. A technical challenge to ensuring image-formation capabilities and achieving considerable reductions in the overall length of the lens system is virtually untapped at present. Nor are any satisfactory results obtained.

Most of actual zoom lenses for compact cameras have a mechanism capable of receiving them in an associated camera body, regardless of their zoom types. To this end, a collapsing mechanism is provided in a space at the wide-angle end wherein the zoom lens becomes shortest.

When the camera is actually used, on the other hand, the zoom lens is used at its original optical layout. In the case of a high-magnification zoom lens, the amount of zooming movement becomes large on the telephoto side. This in turn causes the lens barrel to become very long, offering a center-of-gravity shift problem and hence a decentration problem.

SUMMARY OF THE INVENTION

In view of the state of the art in such a two-group type zoom lens of +− construction, an object of the present invention is to provide a zoom lens system which, albeit having a high zoom ratio, has a short overall length not only at its wide-angle end but also at its telephoto end and a low telephoto ratio at the telephoto end where the overall length becomes longest, so that when it is used on a camera, the size of the camera can be reduced.

In order to accomplish the aforesaid object, the present invention provides a zoom lens system comprising, in order from an object side thereof, a first lens group having positive refracting power and a second lens group having negative refracting power, characterized in that for zooming from a wide-angle end to a telephoto end of said system, each lens group moves toward said object side while a spacing between said first lens group and said second lens group becomes narrow, and said system satisfies the following conditions:

$$0.02 < |f_2|/f_T < 0.35 \quad (1)$$

$$0.30 < \Delta X_{2T}/f_T < 0.58 \quad (2)$$

$$2.25 < \beta_{2T}/\beta_{2W} < 5.0 \quad (3)$$

where $f_2$ is a focal length of said second lens group, $f_T$ is a focal length of said zoom lens system at said telephoto end, $\Delta X_{2T}$ is an amount of zooming of said second lens group to said telephoto end as measured on a wide-angle end basis, $\beta_{2T}$ is a transverse magnification of said second lens group at said telephoto end, and $\beta_{2W}$ is a transverse magnification of said second lens group at said wide-angle end.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 5(a) through 5(c) are views in section illustrating Example 5 of the zoom lens system according to the invention.

FIGS. 8(a) through 8(c) are aberration diagrams for Example 8 of the zoom lens system according to the invention.

FIGS. 15(a) through 15(c) are aberration diagrams for Example 7 of the zoom lens system according to the invention.

DESCRIPTION OF THE PREFERRED EMBODIMENTS

Figure 1:
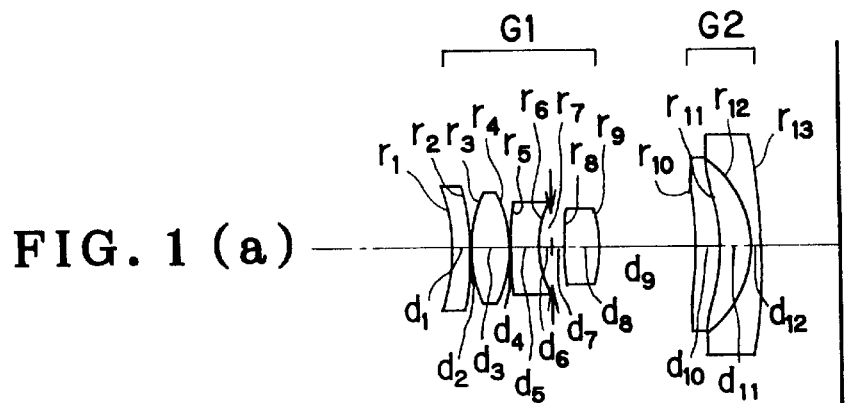
FIGS. 1(a) through 1(c) are views in section illustrating Example 1 of the zoom lens system according to the invention.
Figure 1:
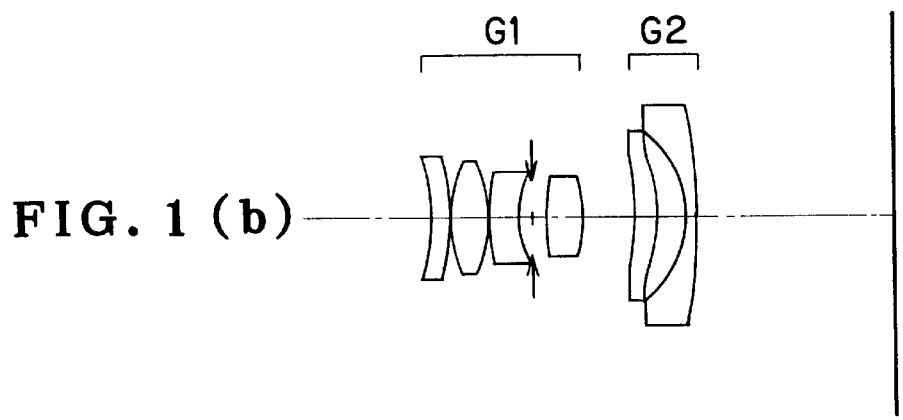
Figure 1:
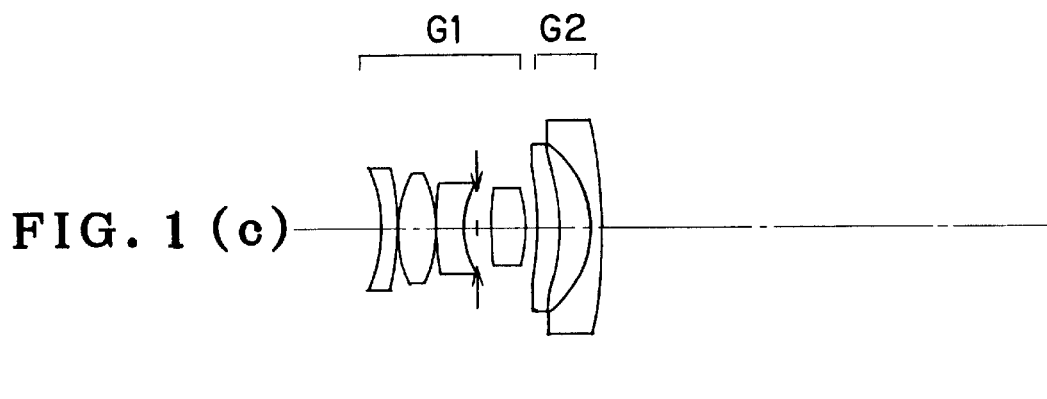

According to the present invention, the size of an optical system is so reduced that a lens unit can be housed in a small camera, thereby reducing the size of a conventional zoom compact camera.

So far, two-group type zoom lens systems have been used in relatively low-magnification applications and three-group type zoom lens systems have been currently in vogue for high-magnification uses. Some variations of these types are available; however, they result in an increased number of lens groups. To simplify the lens arrangement for each system, it has been proposed to reduce its aperture ratio at the telephoto end and make use of an aspherical surface.

Although this proposal makes it possible to reduce the size of the system at the wide-angle end and during lens collapsing, yet it is not preferable because the amount of zooming movement of the lens groups becomes large during zooming to the telephoto end.

The amount of movement is primarily dependent on the zoom ratio and the focal length of the zooming part. Therefore, if the amount of movement of the lens system is reduced with no modification thereto, the telephoto end then becomes short, ending up with a decrease in the zoom ratio itself. When a zoom lens system is constructed according to a paraxial design, accordingly, it is necessary to increase the zoom efficiency of the final lens group having negative refracting power, which is a main zooming part and located nearest to the image side. This in turn enables the amount of zooming movement of the final lens group to be reduced. A problem in this case is that the powers of the lens groups become large; that is, it is very difficult to maintain high image-formation capabilities by use of conventional means for correcting aberrations.

At the telephoto end in particular, it is required to reduce the telephoto ratio that is a measure of size reductions. However, this makes correction of aberrations very difficult, as well known in the art. In this case, it is required to find the best power profile and lens arrangement. Moreover, the telephoto ratio is reduced to about 0.8 or less, and so it is required to make effective correction fro aberrations harnessing the properties of an optical element.

A common challenge to the zoom lens for compact cameras is to establish technical means for achieving higher aperture ratios and higher zoom ratios, thereby obtaining stable yet satisfactory performance. Especially to ensure performance and stable image plane at an intermediate focal length or maintain satisfactory performance at the same time over a wide zooming range, technical means for reducing field curvature fluctuations due to zooming must be entrenched.

The present invention has now succeeded in achieving a two-group zoom lens having a high magnification or a high zoom ratio of 3 or greater by increasing the power of the second lens group so that aspherical surfaces can be effectively used to reduce the amount of movement of the second lens group.

That is, the present invention provides a zoom lens system which comprises, in order from an object side of the system, a first lens group having positive refracting power and a second lens group having negative lens group. For zooming from the wide-angle end to the telephoto end of the system, each lens group moves toward the object side while the spacing between the first and second lens groups becomes narrow. According to the invention, this zoom lens system is characterized by satisfying the following condition:

$$0.02 < |f_2|/f_T < 0.35 \tag{1}$$

Here $f_2$ is the focal length of the second lens group, and $f_T$ is the focal length of the zoom lens system at the telephoto end.

Condition (1) is important to reduce the length of the lens system at the telephoto end. Any deviation from the lower limit of 0.02 may ensure a power profile favorable for size reductions because the focal length of the second lens group becomes very short. However, correction of aberrations becomes difficult. In addition, the number of lenses becomes larger than required. This is not preferable in view of size reductions. Exceeding the upper limit of 0.35 may be actually favorable for correction of aberrations. However, this is contrary to size reductions because of an increase in the amount of zooming movement. This will be explained with reference to the following condition (2), too.

Preferably, the first lens group should comprise at least one doublet consisting of a positive lens and a negative lens with an aperture stop incorporated therein while the second lens group should comprises at least a positive lens and a negative lens. This zoom lens system becomes shortest at the wide-angle end and the spacing between the first and second lens groups becomes narrow upon telephotography.

In consideration of high magnifications, condition (2) should be satisfied to reduce the amount of movement of the zoom lens system.

$$0.30 < \Delta X_{2T}/f_T < 0.58 \tag{2}$$

Here $f_T$ is the focal length of the zoom lens system at the telephoto end, and $\Delta X_{2T}$ is the amount of zooming of the second lens group to the telephoto end as measured on a wide-angle end basis.

The requirement for achieving a zoom lens which has a high zoom ratio but is reduced in size is to increase the power of the second lens group. Exceeding the upper limit of 0.58 in condition (2) is contrary to the purport of the present invention, because the lens length at the telephoto end is at most the same as that of a prior art compact zoom lens. Any deviation from the lower limit of 0.30 may be favorable for size reductions. However, correction of aberrations becomes too difficult to achieve the required image-formation capabilities.

In the present invention, the following condition (3) should also be satisfied:

$$2.25 < \beta_{2T}/\beta_{2W} < 5.0 \tag{3}$$

Here $\beta_{2T}$ is the transverse magnification of the second lens group at the telephoto end and $\beta_{2W}$ is the transverse magnification of the second lens group at the wide-angle end.

Condition (3) relates to making the magnification of the inventive zoom lens high, and gives a definition of the zoom ratio to be shared by the second lens group. Any deviation from the lower limit of 2.25 in condition (3) is contrary to the purport of the present invention, because the zoom range of the zoom lens system becomes narrow. At greater than the upper limit of 5.0, a paraxial solution may be obtained. However, it is difficult to achieve the necessary amount of zooming movement within the range defined by condition (2) and maintain image-formation capabilities.

Assume here that the power profile of each lens group is determined. Then, each lens group must have a proper lens arrangement. It is thus preferable that the first lens group should be constructed of at least a doublet consisting of a positive lens and a negative lens, and that the second lens group should be constructed of at least a negative lens and a positive lens. Especially to reduce aberration fluctuations during both zooming and focusing, it is preferable that each lens group should be constructed of at least a positive lens and a negative lens so that various aberrations and chromatic aberration occurring at each lens group can be reduced, as mentioned specifically below.

In consideration of image formation capabilities, the optimum lens arrangement must be taken into account. Indeed, however, it is understood that combinations of specific lens arrangements with optical elements are needed to maintain the image formation capabilities. In the present invention, the first lens group is constructed of at least a doublet consisting of a positive lens and a negative lens. By use of at least one aspherical surface, it is possible to make satisfactory correction for spherical aberrations at the telephoto region.

When the doublet is constructed of a positive lens and a negative lens according to the present invention, it is understood that the doublet includes two types, one called an air-spaced or non-cemented type comprising two lenses with a minute space located between them and another called a cemented type comprising two lenses brought into close contact with each other using an adhesive, etc. Which type is selected should be determined while the overall lens arrangement, balances of correction of aberrations, decentration errors and sensitivity, etc. are taken into consideration.

Preferably in the present invention, the first lens group should have an aperture stop therein, with at least one aspherical surface used therein. In most cases, focusing is effected by moving out the first lens group as an integral piece, so that the amount of focusing movement can be reduced. However, it is desired to reduce the amount of residual aberrations by the first lens group itself. The aperture stop may be positioned in the rear of, or within, the first lens group. This in turn has an influence on the outer diameters of the first and second lens groups. It is here understood that the optimum lens arrangement for the first and second lens groups varies depending on the position of the aperture stop.

The arrangement of the second lens group that is of vital importance to put the present invention into practical use is now explained. It is required that the second lens group be constructed of at least one positive lens and one negative lens. When the value of condition (1) is small, it is desired for correction of aberrations that the second lens group be constructed of three lenses or one negative lens, one positive lens and one negative lens. This construction is important to maintain image-formation capabilities at the peripheral portion on the wide-angle side in particular. By using at least one aspherical surface or two aspherical surfaces in the second lens group, for instance, an aspherical surface for the concave surface of the negative lens on the object side, it is easy to achieve an optical system ensuring image-formation capabilities on the wide-angle side. In particular, this aspherical surface portion correlates with the peripheral performance of the system at the wide-angle region, and so it is desired that the aspherical surface be configured such that the amount of asphericity tends to increase. In view of the foregoing considerations, the following requirements should be satisfied so as to achieve the optical system according to the present invention.

First, the back focus of the system at the wide-angle end and the power profile of the system are determined by conditions (1) and (2). The first lens group is then comprised of at least a negative lens strongly concave on the object side and a double-convex positive lens. The use of an aspherical surface or surfaces for one or both sides of the negative lens has a great effect on correction of spherical aberrations at the long-focus region of the system. When an aspherical surface is used for the image-side surface of the positive lens, some effects are obtainable on correction of coma in addition to spherical aberrations. When relatively low-dispersion glass is used for the positive lens, there are some effects on correction of chromatic aberrations even when the first lens group is constructed of a small number of lenses. To obtain more stable performance, it is preferable that an additional positive lens is located on the image side of the positive lens and an aspherical surface is used for the image side of the additional positive lens, because there is a striking effect on correction of coma at region from the wide-angle end to the intermediate focal length of the system. This positive lens may be constructed of a cemented doublet.

Next, the second lens group that is a zooming part is constructed of at least a positive lens and a negative meniscus lens. As defined by condition (1), the power of the second lens group becomes large, and so it is desired to use an aspherical surface for at least one surface of the positive lens and an aspherical surface for the object-side surface of the negative lens. When the value of condition (1) is on the lower-limit side, the power of the second lens group becomes large, and so it is desired that the second lens group be constructed of three lenses or a negative, a positive and a negative lens as viewed from the object side of the system. By use of an aspherical surface for one surface of the first lens and aspherical surfaces for both surfaces of the second lens, it is possible to make satisfactory correction of image plane at the wide-angle region.

According to the simplest embodiment of the present invention, the first lens group consists of, in order from the object side thereof, a negative meniscus lens, a double-convex positive lens, an aperture stop and one positive lens. The second lens group is made up of a negative meniscus lens, positive lens and a negative meniscus lens. By use of aspherical surfaces as mentioned above, however, it is possible to obtain the necessary image-formation capabilities all over the zooming region with a simpler arrangement. For instance, the first lens group comprises at least one negative lens and two positive lenses with at least one aspherical surface used therein, and the second lens group is made up of a positive lens and a negative meniscus lens as viewed in order from the object side, with at least one aspherical surface used for the positive lens.

The aspherical surface in the first lens group, when used for the lens located on the object side, has an effect on correction of spherical aberrations on the telephoto side and when used for the lens surface located nearest to the image side, has an effect on correction of off-axis aberrations as well.

By use of an aspherical surface for the positive lens in the second lens group, a great effect is obtainable on correction of field curvature at the wide-angle region. Similar effects are obtainable even when the aspherical surface is used for the concave surface of the negative meniscus lens.

If the first lens group of such similar construction as mentioned above is used in combination with the second lens group constructed of, in order form the object side, a negative lens, a positive lens and a negative meniscus lens with at least one aspherical surface used for the negative lens and at least one aspherical surface used for the positive lens, it is possible to reduce the overall length of the system by making the telephoto ratio on the telephoto side low. When the amount of zooming movement is reduced, there is an increase in the power of the second lens group. This means that the lower limit of condition (1) is reached, and so some measures are needed for lens arrangement and how to use aspherical surfaces.

In this case, it is required to reduce any increase in residual aberrations due to an power increase by making effective use of aspherical surfaces in the two lens groups, thereby reducing field curvature and off-axis coma.

If the first lens group of similar construction as mentioned above is used in combination with the second lens group made up of, in order from the object side, a negative lens, a positive lens and a negative meniscus lens with at least one aspherical surface used for the negative meniscus lens, it is then possible to achieve the same effect as could be obtained when an aspherical surface is used for the positive lens.

By use of a negative meniscus lens—concave on the object side—on the side of the first lens group located nearest to the object side, not only can correction of aberrations be made but also the positions of principal positions can be placed under control. If an spherical surface is used here, it is then possible to obtain a great effect on correction of spherical aberrations at the telephoto region of the system.

The present invention will now be explained with reference to Examples 1 to 8.

EXAMPLE 1

Example 1 is directed to a two-group zoom lens system having a focal length of 38.9 to 90.5 mm and an F-number of 4.36 to 10.13. FIGS. 1($a$), 1($b$) and 1($c$) are illustrative of the lens arrangement in section of the zoom lens system. More illustratively, FIG. 1($a$), 1($b$) and 1($c$) are sectional views of the zoom lens system at its wide-angle end (a), its intermediate position (b) and its telephoto end (c), respectively. This also holds for Examples 2 to 8.

The first lens group G1 consists of four lenses or a negative meniscus lens concave on its object side, a double-convex positive lens, a negative meniscus lens convex on its object side, an aperture stop and a double-convex positive lens, and the second lens group G2 consists of two lenses or a positive meniscus lens concave on its object side and a negative meniscus lens concave on its object side. Eight aspherical surfaces are used, two for both surfaces of the first negative meniscus lens in the first lens group G1, one for the object-side surface of the first double-convex positive lens in G1, one for the object-side surface of the second negative meniscus lens in G1, one for the image-side surface of the second double-convex positive lens in G1, two for both surfaces of the positive meniscus lens in the second lens group G2, and one for the object-side surface of the negative meniscus lens in G2. This zoom lens system has a telephoto ratio of 0.818 at the telephoto end. This example has a total length substantially close to the purport of the present invention, and is simple in construction between the number of moving lens groups is reduced.

Figure 9:
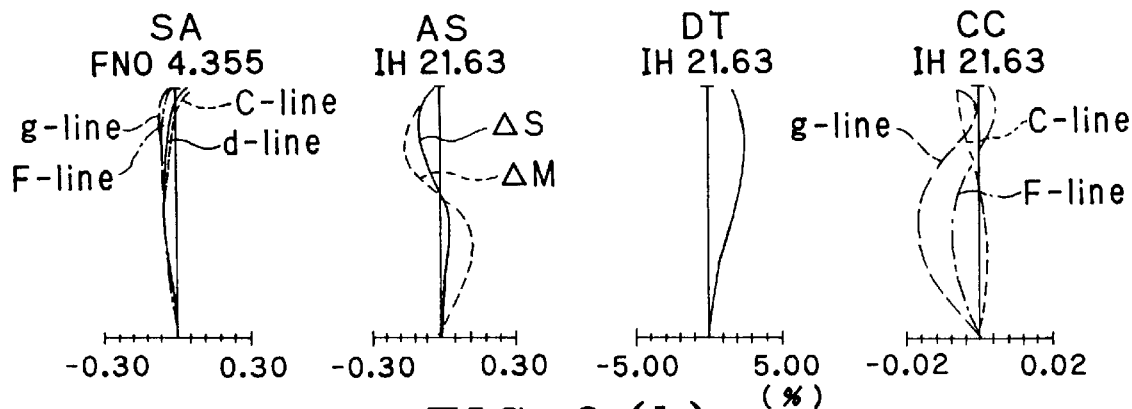
FIGS. 9(a) through 9(c) are aberration diagrams for Example 1 of the zoom lens system according to the invention.
Figure 9:
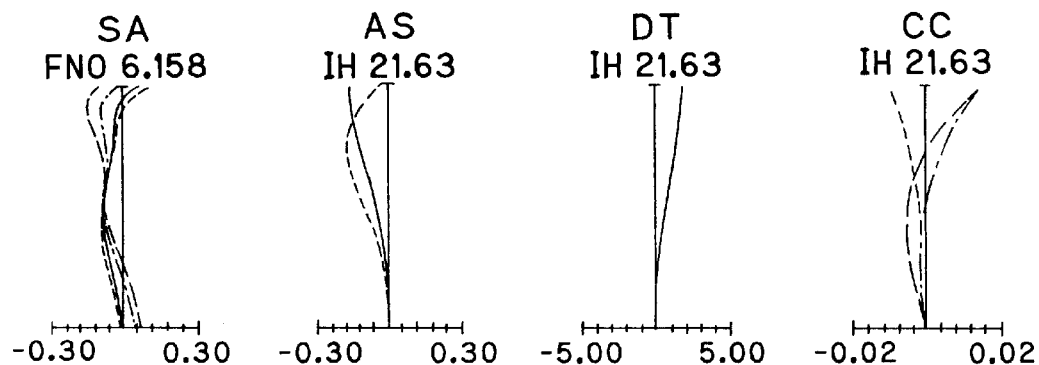
Figure 9:
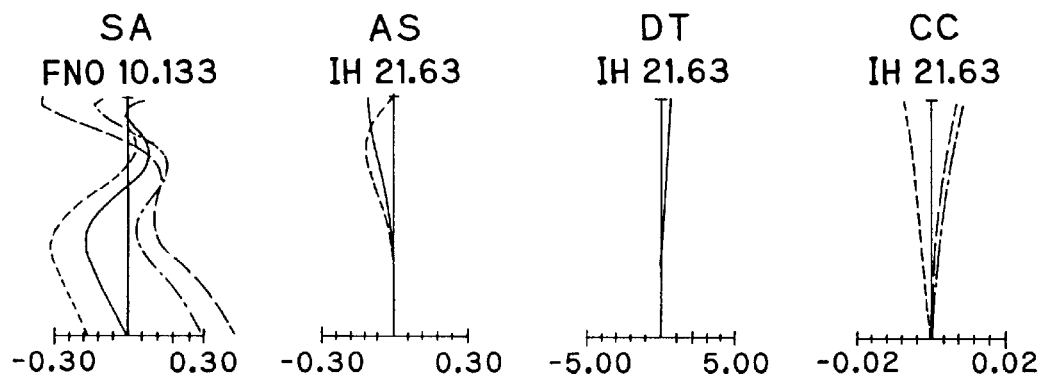

Aberration diagrams for this example are shown in FIGS. 9($a$), 9($b$) and 9($c$) illustrative of spherical aberration SA, astigmatism AS, distortion DT and chromatic aberration of magnification CC at the wide-angle end (a), intermediate position (b) and telephoto end (c), respectively. In these drawings, "IH" is an abbreviation of image height. This also holds for Examples 2 to 8. As can be predicted from FIGS. 9($a$) through 9($c$), this example has well-balanced aberrations as a whole. As far as the spherical aberrations at the telephoto end is concerned, however, a problem with higher-order aberrations remains unsolved.

EXAMPLE 2

Figure 2:
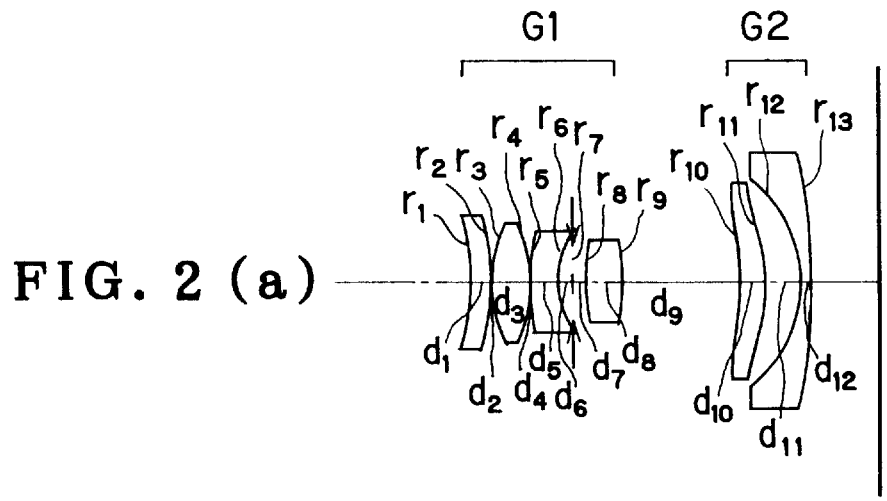
FIGS. 2(a) through 2(c) are views in section illustrating Example 2 of the zoom lens system according to the invention.
Figure 2:
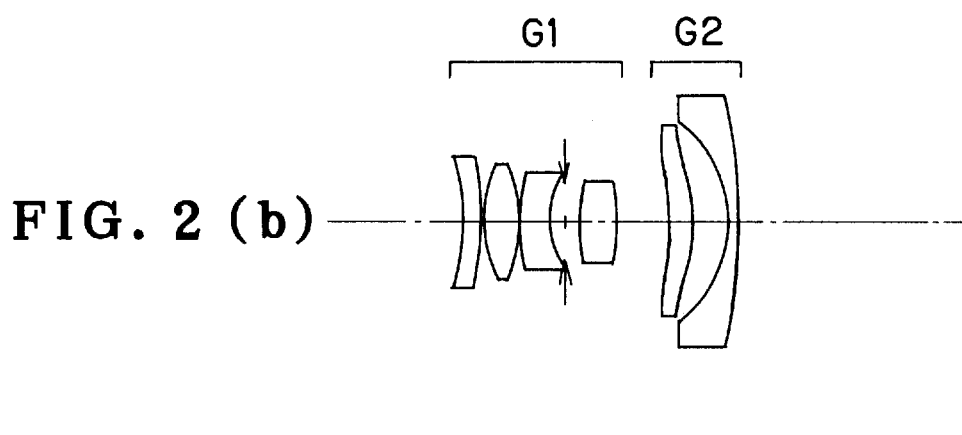
Figure 2:
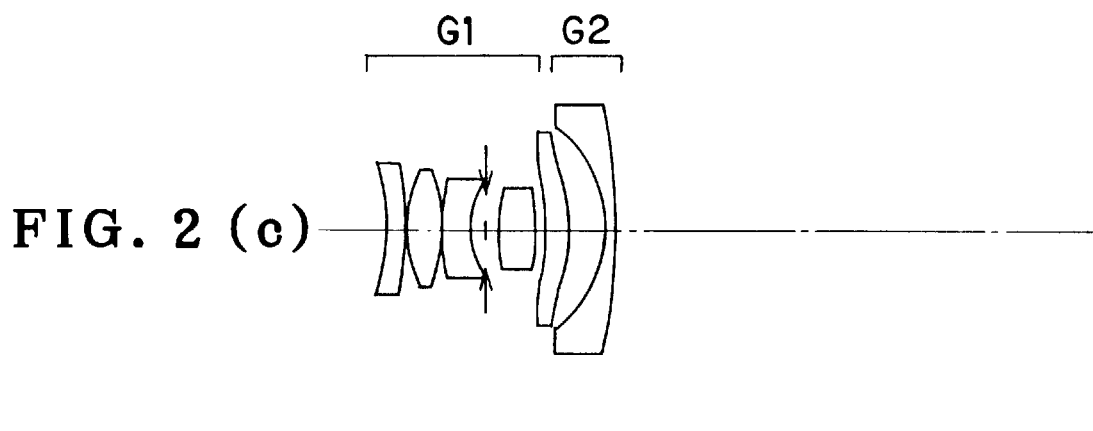
Figure 10:
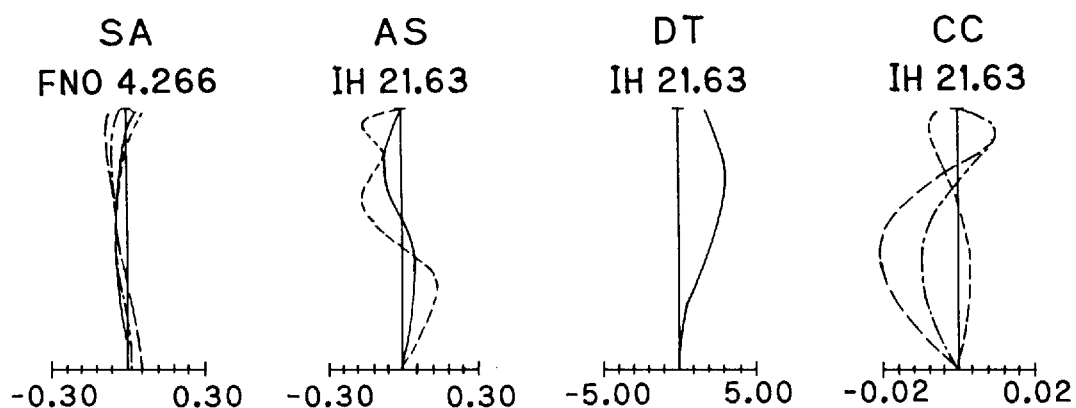
FIGS. 10(a) through 10(c) are aberration diagrams for Example 2 of the zoom lens system according to the invention.
Figure 10:
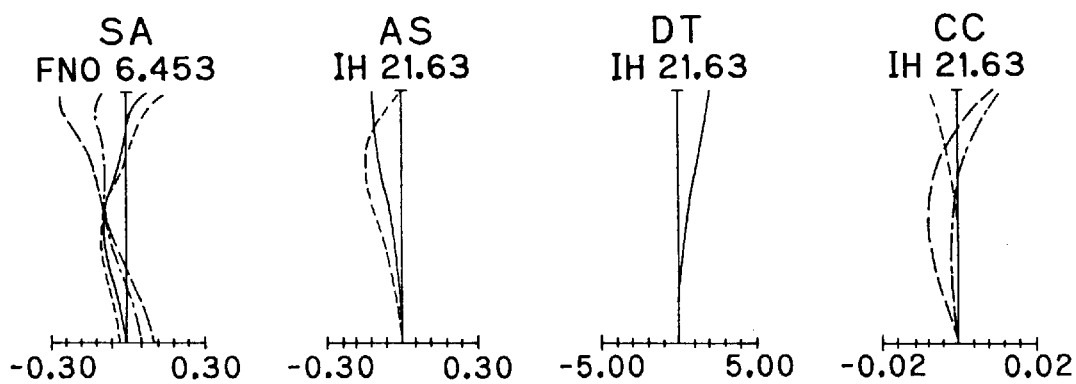
Figure 10:
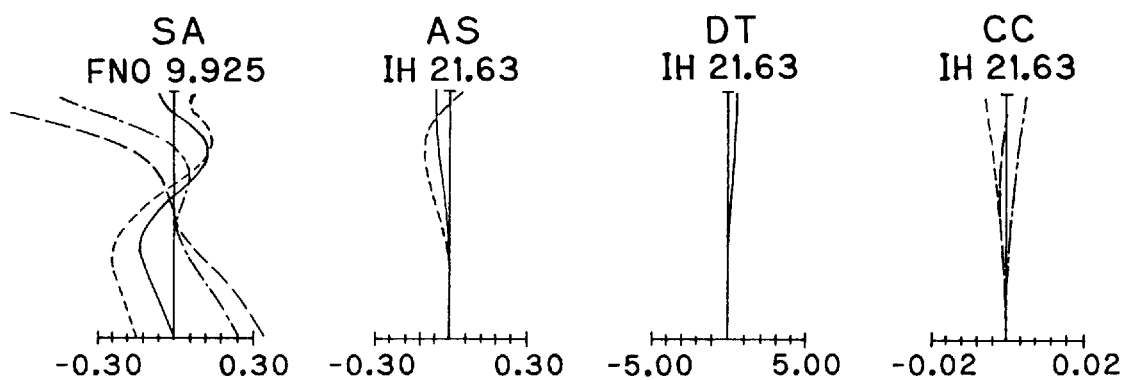

Example 2 is directed to a two-group zoom lens system having a focal length of 38.9 to 90.5 mm and an F-number of 4.27 to 9.93. This example has substantially the same construction as in Example 1, inclusive of its specifications, and has a telephoto ratio of 0.818 at the telephoto end. FIGS. 2($a$), 2($b$) and 2($c$) are illustrative of the lens arrangement in section of the zoom lens system, and FIGS. 10($a$), 10($b$) and 10($c$) are aberration diagrams for this example.

EXAMPLE 3

Example 3 is directed to a two-group zoom lens system having a focal length of 39.8 to 117.77 mm and an F-number of 5.57 to 14.53.

Figure 3:
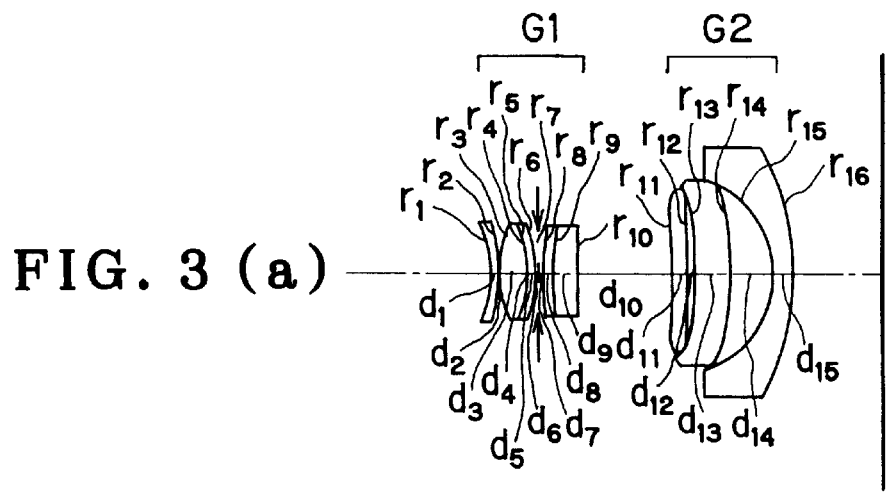
FIGS. 3(a) through 3(c) are views in section illustrating Example 3 of the zoom lens system according to the invention.
Figure 3:
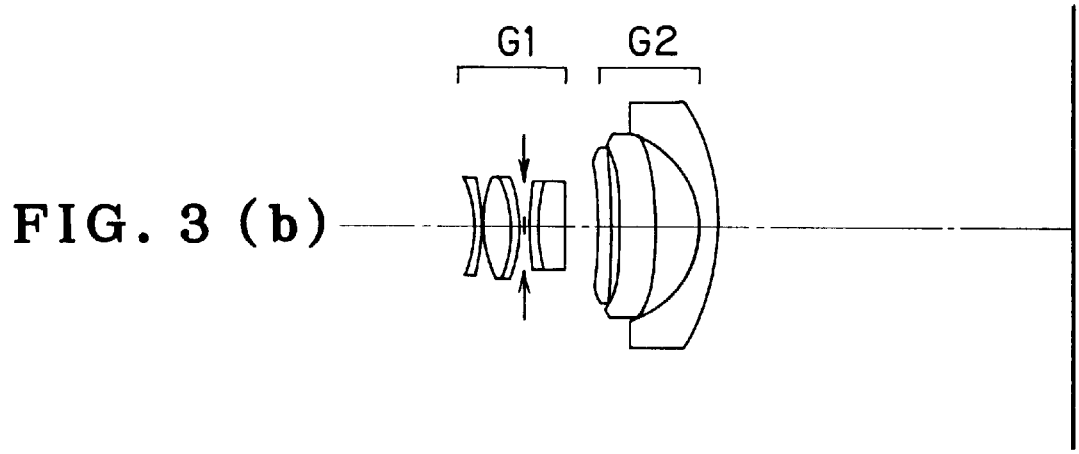
Figure 3:
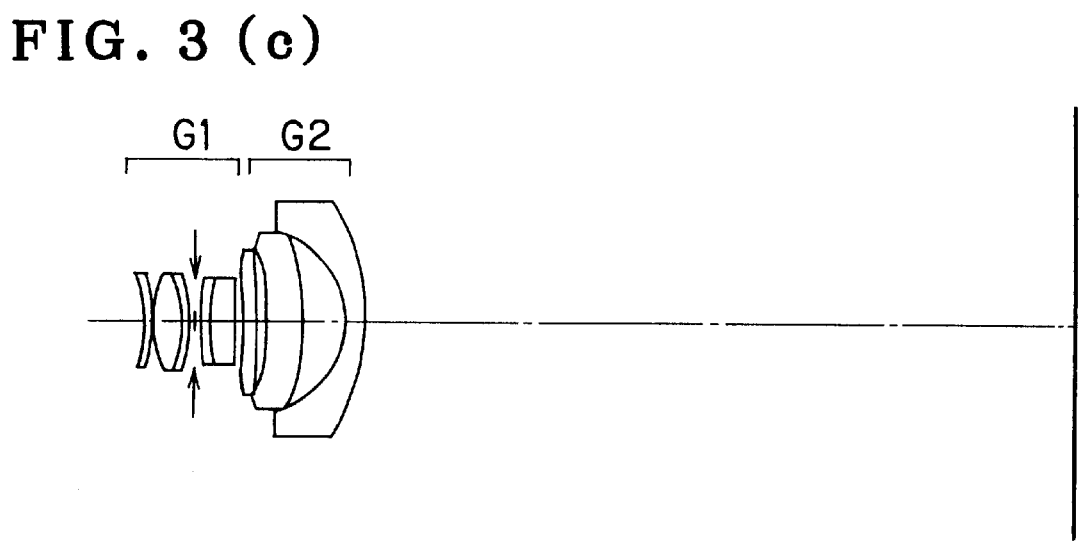
Figure 11:
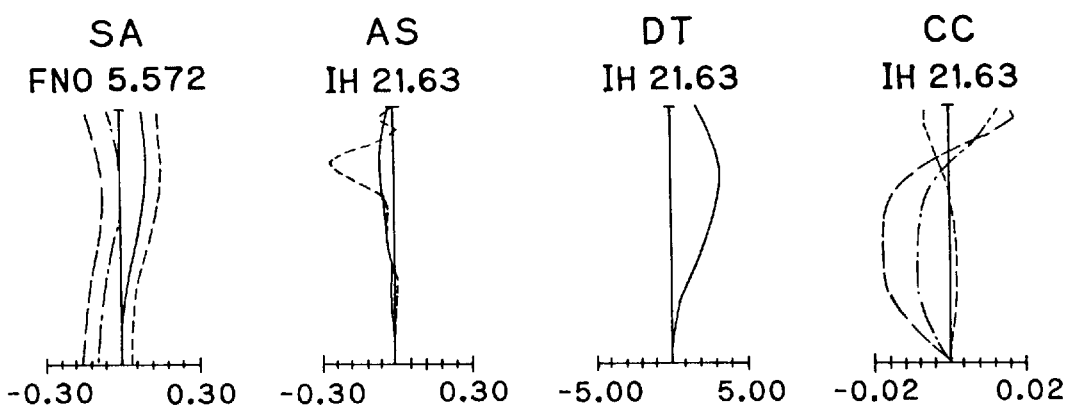
FIGS. 11(a) through 11(c) are aberration diagrams for Example 3 of the zoom lens system according to the invention.
Figure 11:
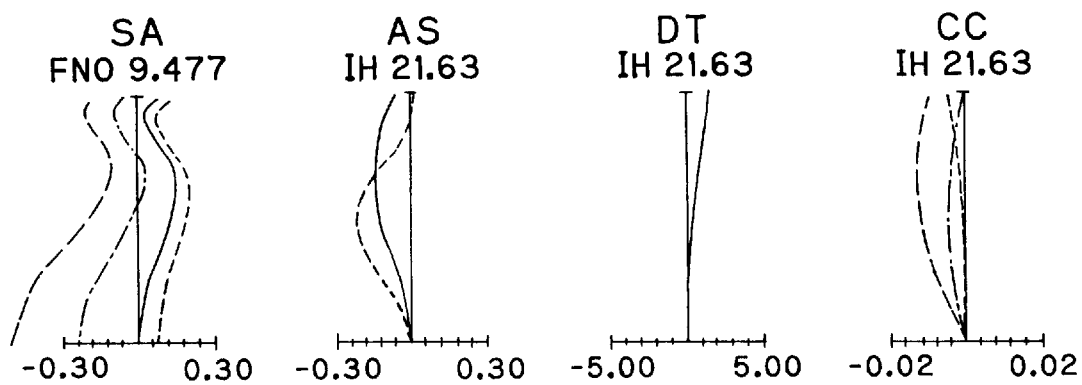
Figure 11:
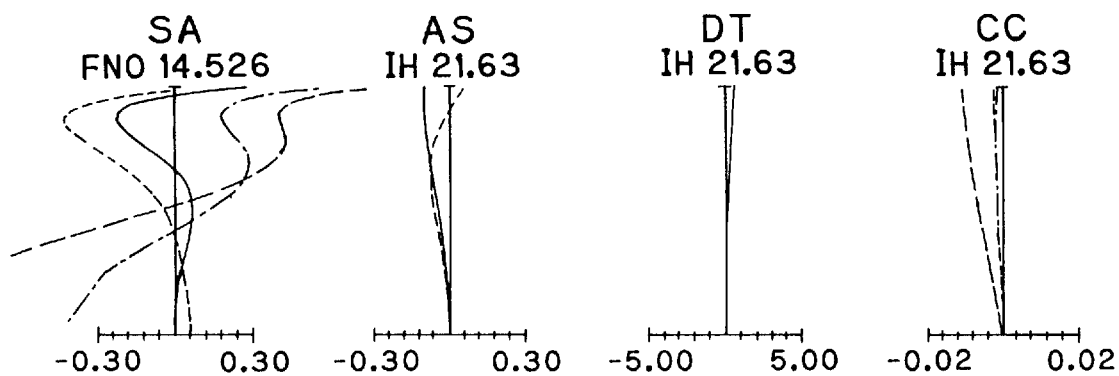

The first lens group G1 is constructed of five lenses or a negative meniscus lens concave on its object side, a non-cemented doublet consisting of a double-convex positive lens and a negative meniscus lens convex on its image side, an aperture stop and a cemented doublet consisting of a negative meniscus lens convex on its object side and a double-convex positive lens, and the second lens group G2 is constructed of a negative meniscus lens convex on its object side, a double-convex lens positive lens and a negative meniscus lens concave on its object side. Six aspherical surfaces are used, one for the object-side surface of the first double-convex positive lens in the firs t lens group G1, one for the image-side surface of the lens located nearest to the image side in G1, one for the object-side surface of the first negative meniscus lens in the second lens group G2, two for the double-convex lens in G2 and one for the object-side surface of the second meniscus lens in G2. This zoom lens system has a telephoto ratio of 0.791 at the telephoto end. FIGS. 3($a$), 3($b$) and 3($c$) are illustrative of the lens arrangement in section of the zoom lens system, and FIGS. 11($a$), 11($b$) and 11($c$) are aberration diagrams for this example. Problems with chromatic aberration of magnification at the wide-angle end, and higher-order aberrations of axial spherical aberrations and chromatic aberrations at the telephoto end remain unsolved.

EXAMPLE 4

Example 4 is directed to a two-group zoom lens system having a focal length of 39.77 to 121 mm and an F-number of 5.35 to 13.4. Example 4 is characterized by being simpler in lens arrangement than Example 3. In Example 3, the second and third lenses in the first lens group G1 are each a doublet. In Example 4, thickness reductions are achieved by eliminating the third lens and using a single lens for a cemented doublet located on the image side of an aperture stop. However, aspherical surfaces are used for both surfaces of the first lens.

Figure 4:
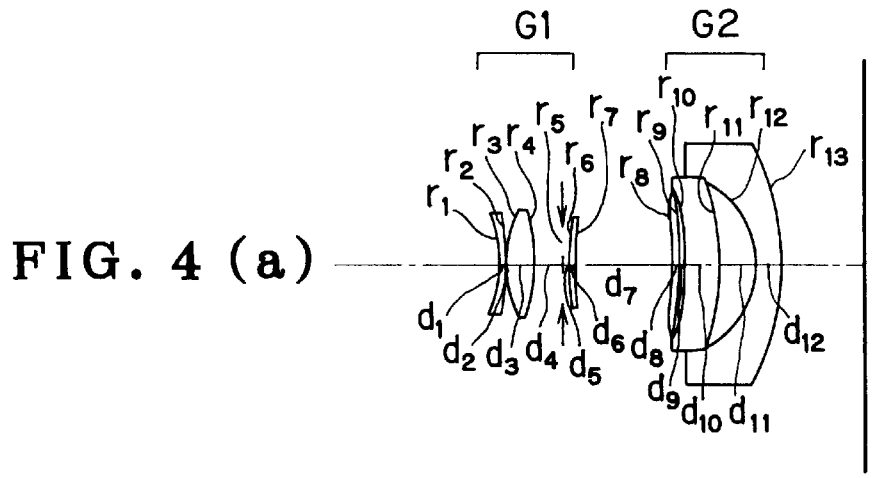
FIGS. 4(a) through 4(c) are views in section illustrating Example 4 of the zoom lens system according to the invention.
Figure 4:
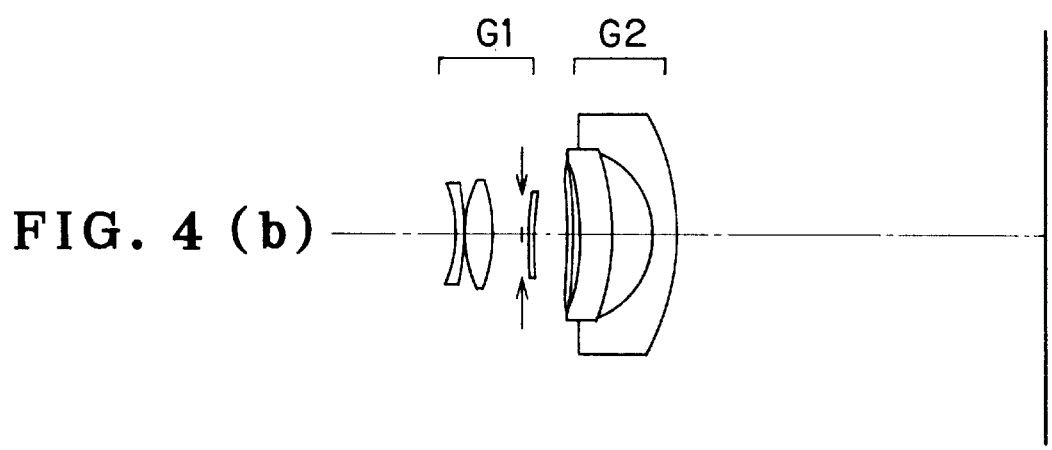
Figure 4:
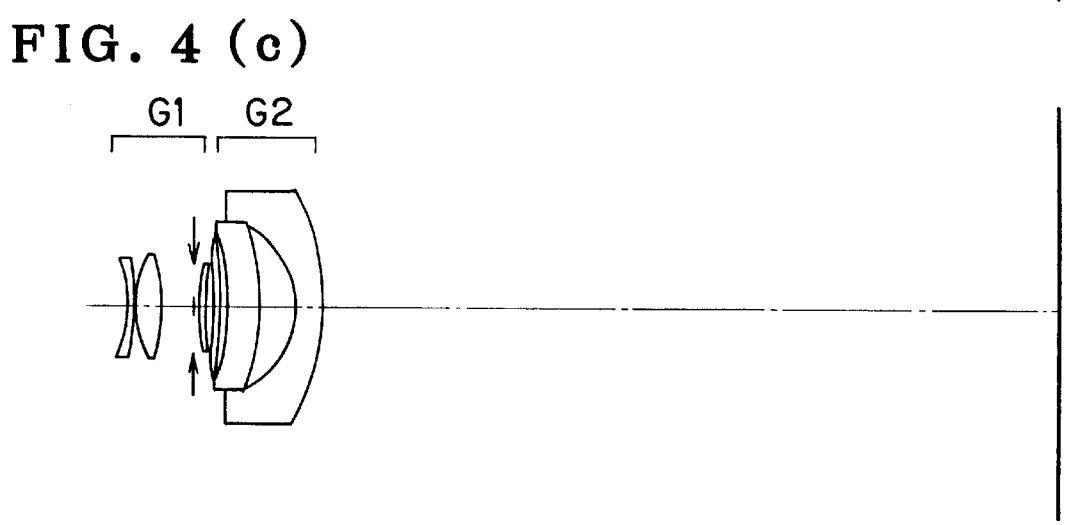
Figure 12:
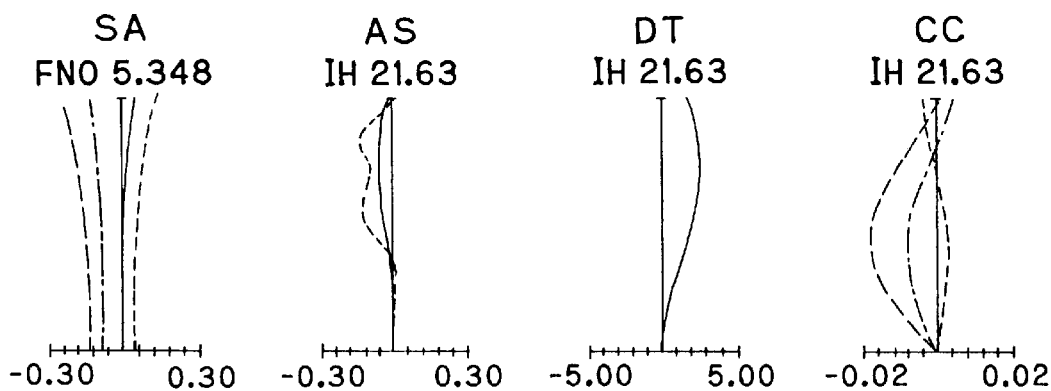
FIGS. 12(a) through 12(c) are aberration diagrams for Example 4 of the zoom lens system according to the invention.
Figure 12:
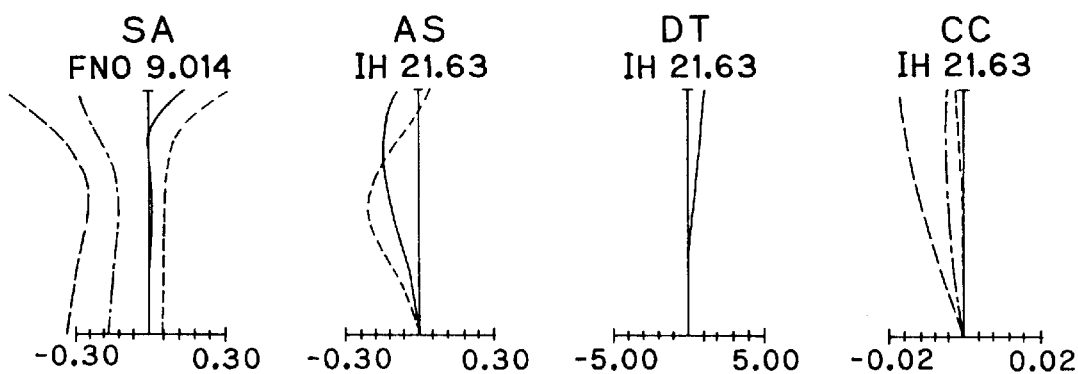
Figure 12:
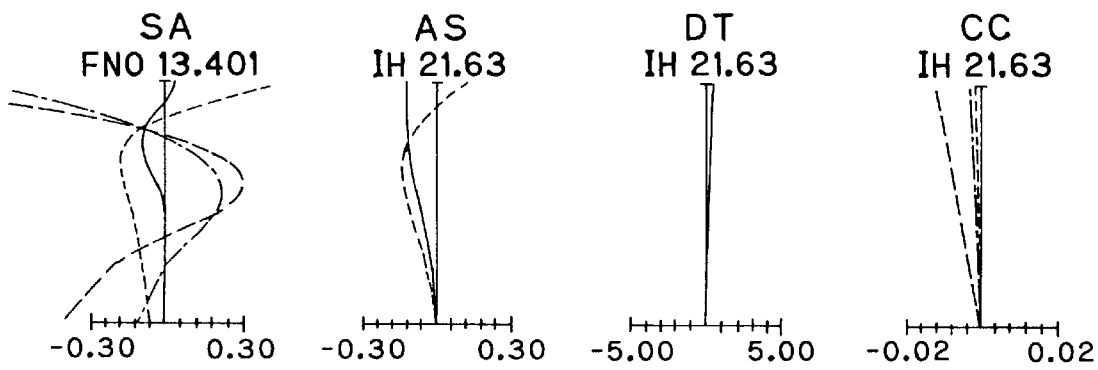

More specifically, the first lens group G1 consists of three lenses or a negative meniscus lens concave on its object side, a double-convex positive lens, an aperture stop and a positive meniscus lens convex on its object side, and the second lens group G2 consists of three lenses or a negative meniscus lens concave on its object side, a positive meniscus lens concave on its object side and a negative meniscus lens concave on its object side. Eight aspherical surfaces are used, two for both surfaces of the negative meniscus lens in the first lens group G1, one for the object-side surface of the double-convex positive lens in G1, one for the image-side surface of the positive meniscus lens in G1, one for the object-side surface of the first negative meniscus lens in the second lens group G2, two for both surfaces of the positive meniscus lens in G2 and one for the object-side surface of the second negative meniscus lens in G2. The zoom lens system has a telephoto ratio of 0.809 at the telephoto end. The amount of zooming movement of the second lens group G2 is somewhat large or 68.3 mm. FIGS. 4($a$), 4($b$) and 4($c$) are illustrative of the lens arrangement in section of the zoom lens system, and FIGS. 12($a$), 12($b$) and 12($c$) are aberration diagrams for this example. As far as longitudinal spherical aberration is concerned, no problem is found with reference to the reference wavelength. However, a problem with chromatic aberrations remains unsolved.

EXAMPLE 5

Figure 13:
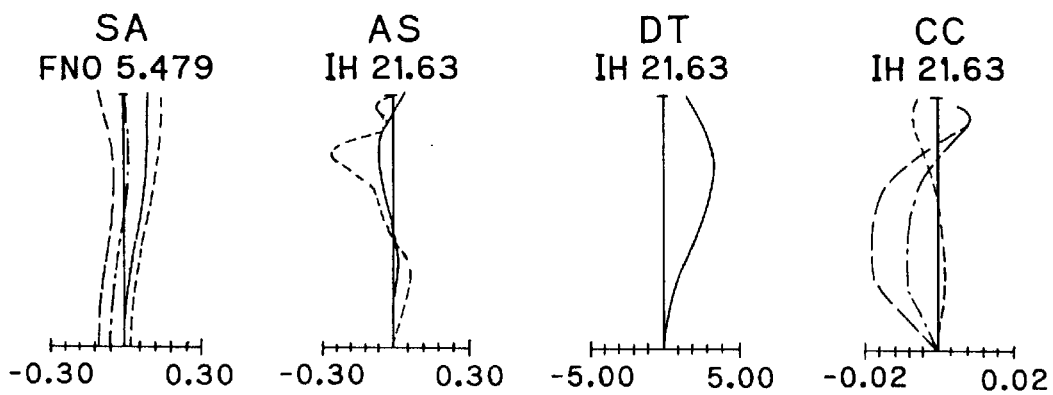
FIGS. 13(a) through 13(c) are aberration diagrams for Example 5 of the zoom lens system according to the invention.
Figure 13:
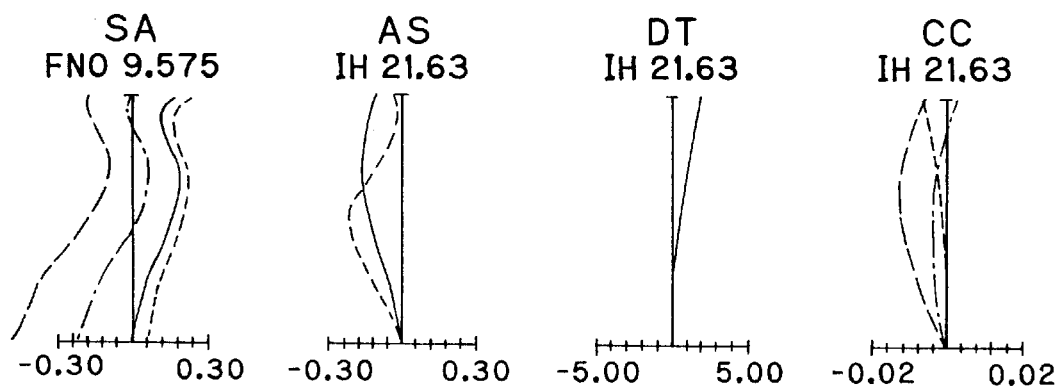
Figure 13:
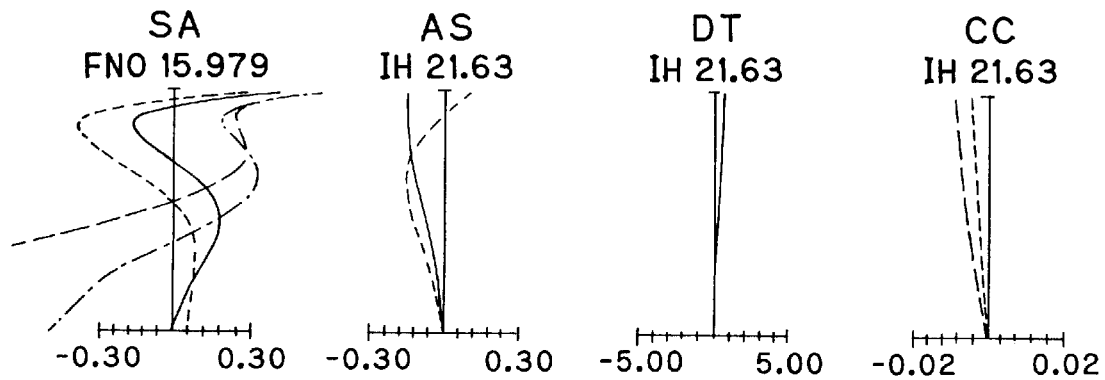

Example 5 is directed to a two-group zoom lens system having a focal length of 39.77 to 131.58 mm and an F-number of 5.48 to 15.98. This example has substantially the same construction as in Example 3, and has a telephoto ratio of 0.749 at the telephoto end. FIGS. 5(a), 5(b) and 5(c) are illustrative of the lens arrangement in section of the zoom lens system, and FIGS. 13(a), 13(b) and 13(c) are aberration diagrams for this example.

EXAMPLE 6

Example 6 is directed to a two-group zoom lens system having a focal length of 39.77 to 131.5 mm and an F-number of 5.1 to 15.25, and is substantially constructed as in Example 4.

Figure 6:
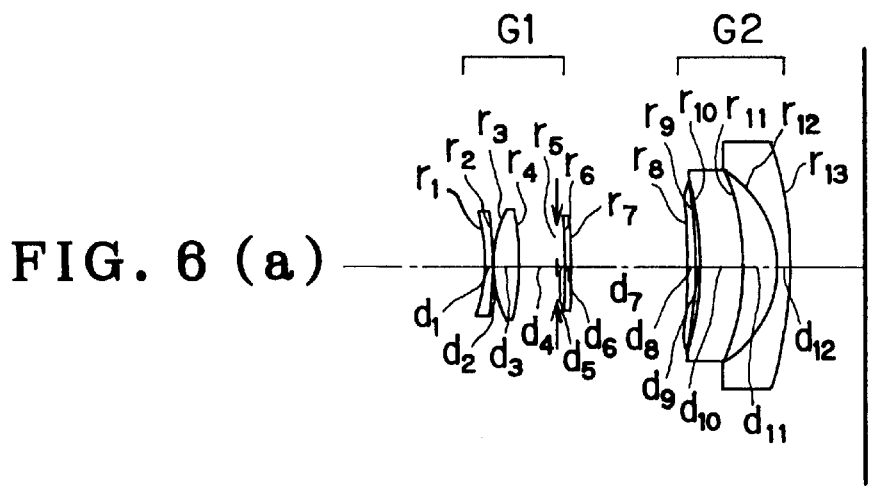
FIGS. 6(a) through 6(c) are aberration diagrams for Example 6 of the zoom lens system according to the invention.
Figure 6:
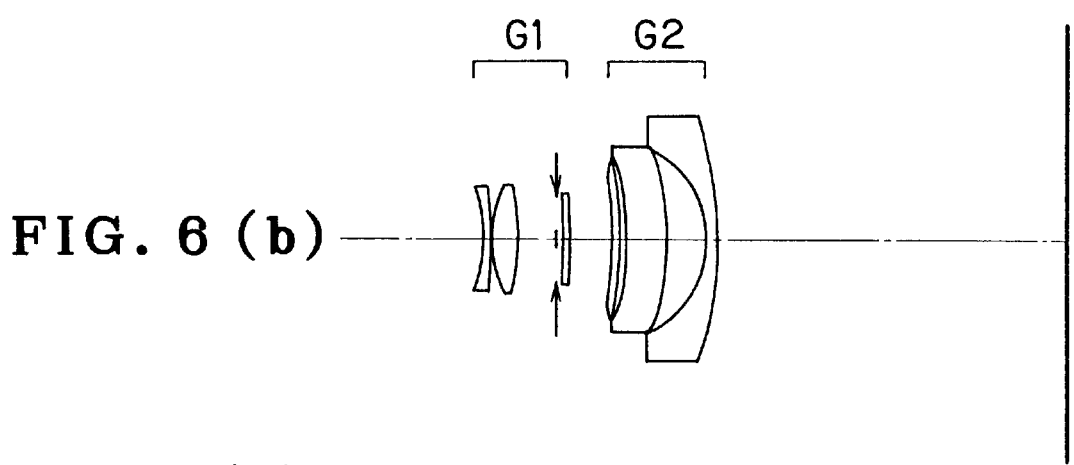
Figure 6:
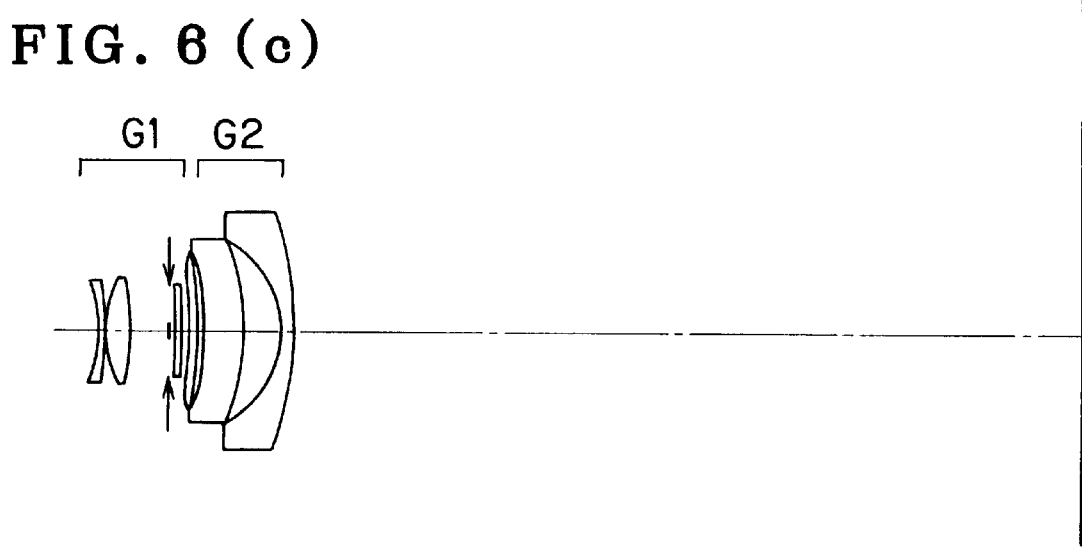
Figure 14:
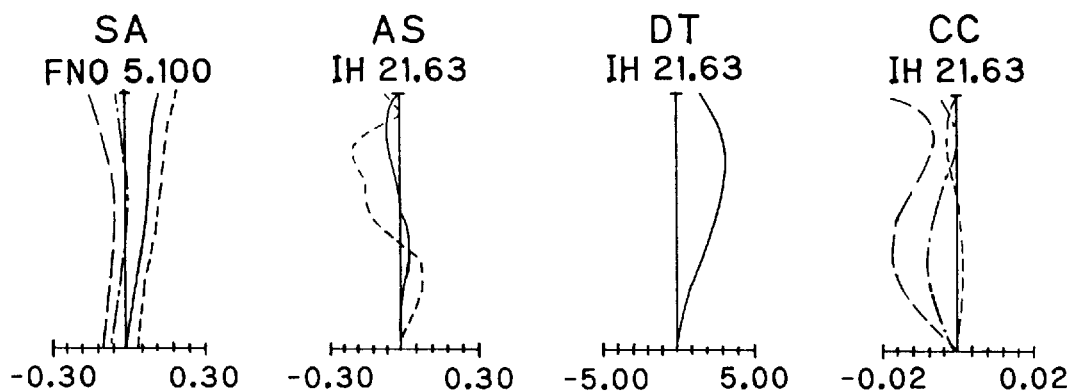
FIGS. 14(a) through 14(c) are aberration diagrams for Example 6 of the zoom lens system according to the invention.
Figure 14:
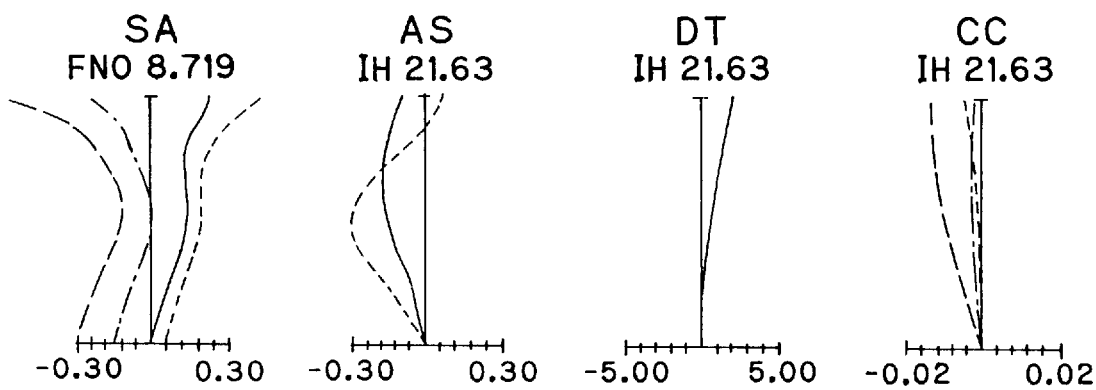
Figure 14:
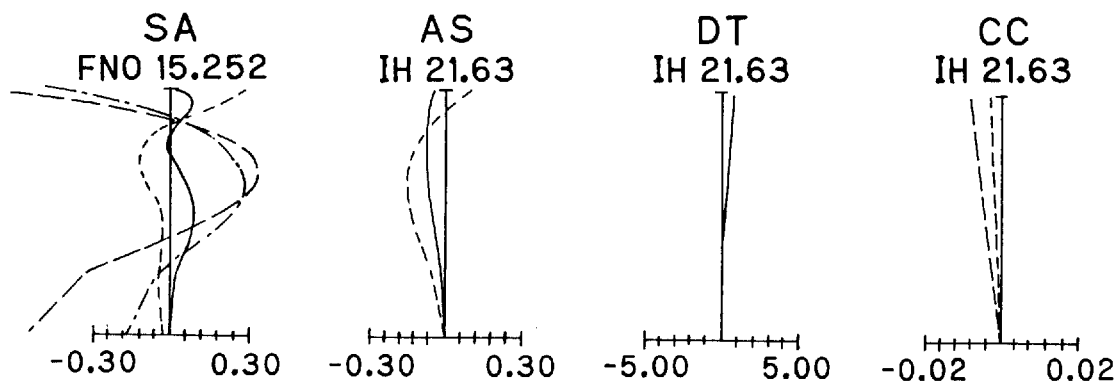

That is, the first lens group G1 consists of three lenses or a negative meniscus lens concave on its object side, a double-convex positive lens, an aperture stop and a positive meniscus lens convex on its image side, and the second lens group G2 consists of three lenses or a negative meniscus lens concave on its object side, a positive meniscus lens concave on its object side and a negative meniscus lens concave on its object side. Seven aspherical surfaces are used, two for both surfaces of the negative meniscus lens in the first lens group G1, one for the image-side surface of the positive meniscus lens in G1, one for the object-side surface of the first negative meniscus lens in the second lens group G2, two for both surfaces of the positive meniscus lens in G2 and one for the object-side surface of the second negative meniscus lens in G2. The zoom lens system has a telephoto ratio of 0.758 at the telephoto end. FIGS. 6(a), 6(b) and 6(c) are illustrative of the lens arrangement in section of the zoom lens system, and FIGS. 14(a), 14(b) and 14(c) are aberration diagrams for this example.

EXAMPLE 7

Figure 7:
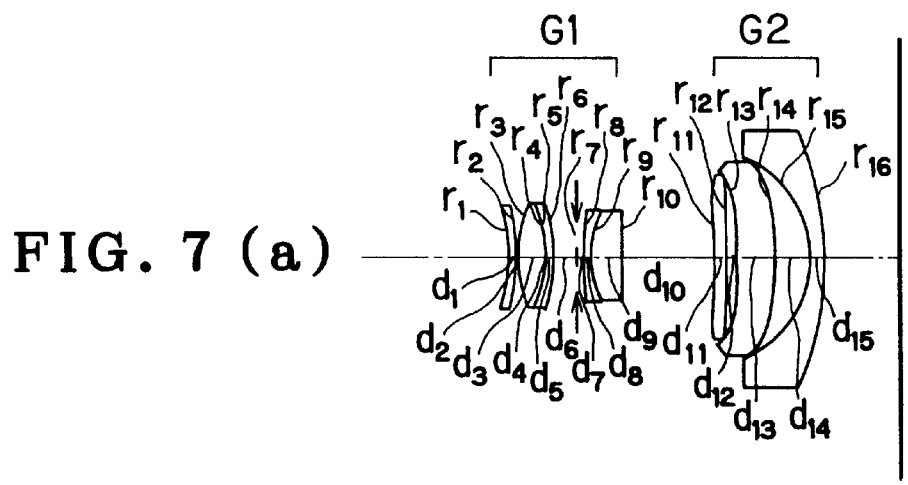
FIGS. 7(a) through 7(c) are aberration diagrams for Example 7 of the zoom lens system according to the invention.
Figure 7:
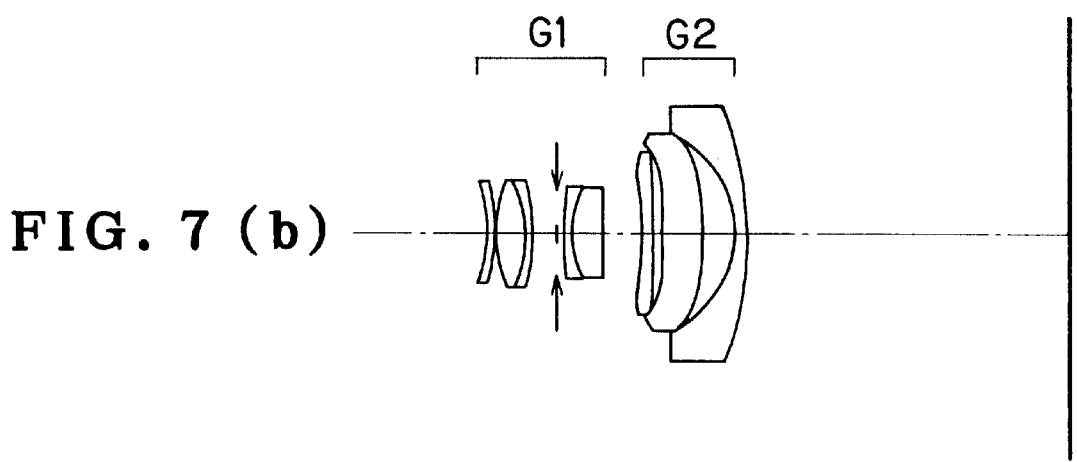
Figure 7:
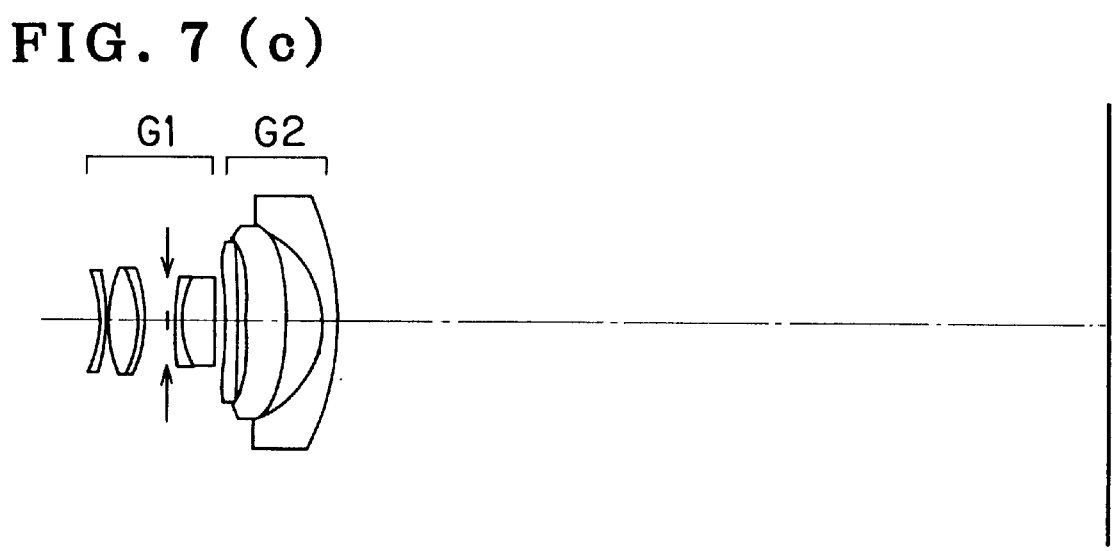

Example 7 is directed to a two-group zoom lens system having a focal length of 39.77 to 141.12 mm and an F-number of 5.46 to 15.86. This example has substantially the same construction as in Examples 3 and 5, and has a telephoto ratio of 0.706 at the telephoto end. FIGS. 7(a), 7(b) and 7(c) are illustrative of the lens arrangement in section of the zoom lens system, and FIGS. 15(a), 15(b) and 15(c) are aberration diagrams for this example.

EXAMPLE 8

Example 8 is directed to a two-group zoom lens system having a focal length of 39.77 to 141.53 mm and an F-number of 5.17 to 15.73, and is substantially constructed as in Example 7.

Figure 16:
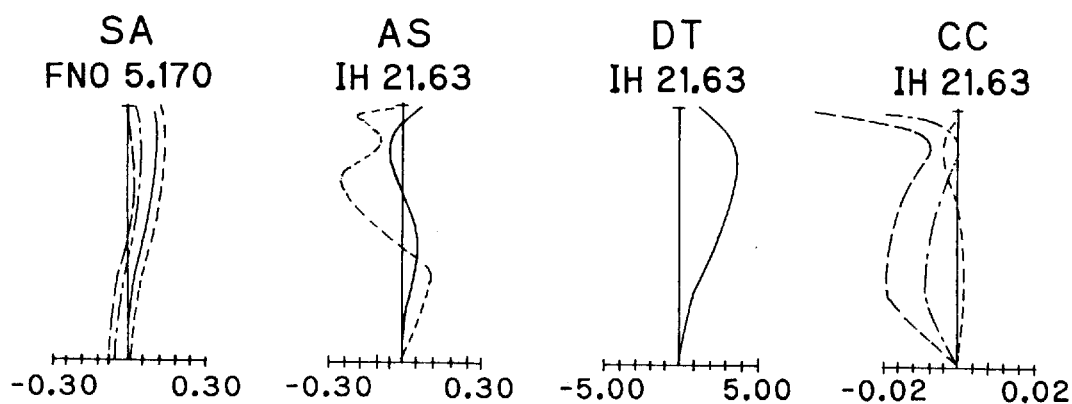
FIGS. 16(a) through 16(c) are aberration diagrams for Example 8 of the zoom lens system according to the invention.
Figure 16:
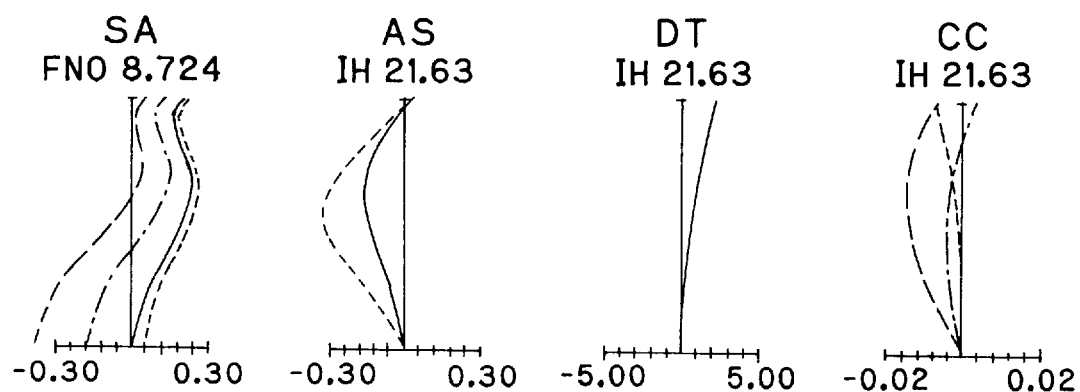
Figure 16:
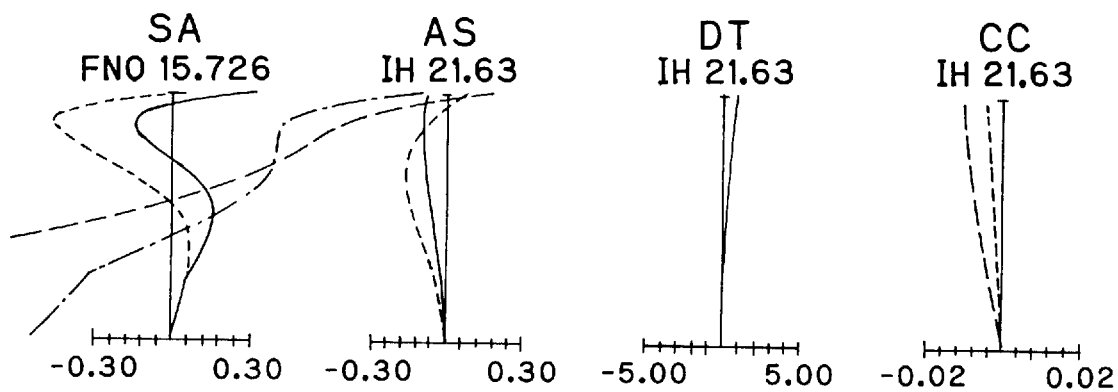

That is, the first lens group G1 is made up of five lenses or a negative meniscus lens concave on its object side, a non-cemented doublet consisting of a double-convex positive lens and a negative meniscus lens convex on its image side, an aperture stop and a cemented doublet consisting of a negative meniscus lens convex on its object side and a double-convex positive lens, and the second lens group G2 consists of a double-concave negative lens, a double-convex positive lens and a negative meniscus lens concave on its object side. Seven aspherical surfaces are used, two for both surfaces of the first double-convex positive lens in the first lens group G1, one for the image-side surface of the lens located nearest to the image side in G1, one for the object-side surface of the double-concave negative lens in the second lens group G2, two for both surfaces of the double-convex positive lens in G2 and one for the object-side surface of the negative meniscus lens in G2. The zoom lens system has a telephoto ratio of 0.704 at the telephoto end. FIGS. 8(a), 8(b) and 8(c) are illustrative of the lens arrangement in section of the zoom lens system, and FIGS. 16(a), 16(b) and 16(c) are aberration diagrams for this example.

Numerical data for each example are set out below. The symbols used hereinafter but not hereinbefore have the following meanings.

f: the focal length of the zoom lens system, $F_{NO}$: F-number, $f_B$: back focus, $r_1, r_2, \ldots$ : the radius of curvature of each lens surface, $d_1, d_2, \ldots$ : the separation between adjacent lens surfaces, $n_{d1}, n_{d2}, \ldots$ : the d-line index of refraction of each lens, and $\nu_{d1}, \nu_{d2}, \ldots$ : the Abbe's number of each lens.

Here let x signify an optical axis provided that the direction of propagation of light is positive and y signify a direction perpendicular to the optical axis. Then, aspherical configuration is given by:

$$x=(y^2/r)/[1+\{1-(K+1)(y/r)^2\}^{1/2}]+A_4 y^4+A_6 y^6+A_8 y^8+A_{10} y^{10}$$

Here r is a paraxial radius of curvature, K is a conical coefficient, and $A_4, A_6, A_8$ and $A_{10}$ are the 4th, 6th, 8th and 10th aspherical coefficients, respectively.

EXAMPLE 1

$$f = 38.900 \sim 55.000 \sim 90.501$$
$$F_{NO} = 4.355 \sim 6.158 \sim 10.133$$
$$f_B = 8.589 \sim 21.387 \sim 49.607$$

| | | | |
|---|---|---|---|
| $r_1 = -25.4248$(Aspheric) | $d_1 = 1.8000$ | $n_{d1} = 1.57099$ | $\nu_{d1} = 50.80$ |
| $r_2 = -44.8648$(Aspheric) | $d_2 = 0.1000$ | | |
| $r_3 = 13.3993$(Aspheric) | $d_3 = 4.1677$ | $n_{d2} = 1.49700$ | $\nu_{d2} = 81.54$ |
| $r_4 = -14.6629$ | $d_4 = 0.1000$ | | |
| $r_5 = 150.2542$(Aspheric) | $d_5 = 3.0000$ | $n_{d3} = 1.74100$ | $\nu_{d3} = 52.64$ |
| $r_6 = 9.5818$ | $d_6 = 1.5000$ | | |
| $r_7 = \infty$ (Stop) | $d_7 = 1.4000$ | | |
| $r_8 = 28.6650$ | $d_8 = 4.0000$ | $n_{d4} = 1.49700$ | $\nu_{d4} = 81.54$ |
| $r_9 = -19.3307$(Aspheric) | $d_9$ = (Variable) | | |
| $r_{10} = -25.1030$(Aspheric) | $d_{10} = 2.5500$ | $n_{d5} = 1.84666$ | $\nu_{d5} = 23.78$ |
| $r_{11} = -16.1780$(Aspheric) | $d_{11} = 3.5204$ | | |
| $r_{12} = -9.8112$(Aspheric) | $d_{12} = 1.0000$ | $n_{d6} = 1.80400$ | $\nu_{d6} = 46.57$ |
| $r_{13} = -59.2098$ | | | |

Zooming Spaces

| f | 38.900 | 55.000 | 90.501 |
|---|---|---|---|
| $d_9$ | 10.3793 | 5.7048 | 1.2745 |

Aspherical Coefficients

1st surface

K=7.2295

$A_4=-1.8514\times10^{-4}$ $A_6=1.5776\times10^{-7}$ $A_8=4.7748\times10^{-8}$ $A_{10}=-6.9640\times10^{-10}$

K=0

2nd surface $A_4=-2.0493\times10^{-4}$ $A_6=5.3847\times10^{-6}$ $A_8=-5.5169\times10^{-8}$
$A_{10}=8.3090\times10^{-11}$
3rd surface
$K=0$
$A_4=-1.6589\times10^{-4}$
$A_6=5.3293\times10^{-6}$
$A_8=-1.2454\times10^{-7}$
$A_{10}=8.1412\times10^{-10}$
5th surface
$K=0$
$A_4=-2.0608\times10^{-5}$
$A_6=-5.5658\times10^{-7}$
$A_8=1.0980\times10^{-8}$
$A_{10}=-1.4641\times10^{-10}$
9th surface
$K=0$
$A_4=-1.0209\times10^{-4}$
$A_6=3.9280\times10^{-6}$
$A_8=-3.7759\times10^{-7}$
$A_{10}=9.6845\times10^{-9}$
10th surface
$K=-32.4790$
$A_4=-1.2968\times10^{-4}$
$A_6=6.2041\times10^{-6}$
$A_8=-6.3178\times10^{-8}$
$A_{10}=2.5050\times10^{-10}$
11th surface
$K=0$
$A_4=1.1210\times10^{-4}$
$A_6=1.2916\times10^{-6}$
$A_8=1.0579\times10^{-8}$
$A_{10}=-5846\times10^{-10}$
12th surface
$K=0$
$A_4=9.0402\times10^{-5}$
$A_6=1.1654\times10^{-6}$
$A_8=-8.6752\times10^{-9}$
$A_{10}=1.7900\times10^{-10}$

EXAMPLE 2

$f = 38.900 \sim 58.836 \sim 90.501$
$F_{NO} = 4.266 \sim 6.4531 \sim 9.925$
$f_B = 7.203 \sim 23.777 \sim 50.103$

| | | | |
|---|---|---|---|
| $r_1 = -32.1924$(Aspheric) | $d_1 = 1.8000$ | $n_{d1} = 1.57099$ | $v_{d1} = 50.80$ |
| $r_2 = -144.9096$(Aspheric) | $d_2 = 0.1000$ | | |
| $r_3 = 11.4315$(Aspheric) | $d_3 = 3.8478$ | $n_{d2} = 1.49700$ | $v_{d2} = 81.54$ |
| $r_4 = -17.6156$ | $d_4 = 0.0630$ | | |
| $r_5 = 47.8312$(Aspheric) | $d_5 = 3.0000$ | $n_{d3} = 1.74100$ | $v_{d3} = 52.64$ |
| $r_6 = 8.7325$ | $d_6 = 1.5000$ | | |
| $r_7 = \infty$ (Stop) | $d_7 = 1.4000$ | | |
| $r_8 = 29.3390$ | $d_8 = 4.0000$ | $n_{d4} = 1.49700$ | $v_{d4} = 81.54$ |
| $r_9 = -22.3909$(Aspheric) | $d_9 = $ (Variable) | | |
| $r_{10} = -21.6688$(Aspheric) | $d_{10} = 2.5500$ | $n_{d5} = 1.84666$ | $v_{d5} = 23.78$ |
| $r_{11} = -14.9767$(Aspheric) | $d_{11} = 3.7270$ | | |
| $r_{12} = -10.6815$(Aspheric) | $d_{12} = 1.0000$ | $n_{d8} = 1.80400$ | $v_{d6} = 46.57$ |
| $r_{13} = -62.2204$ | | | |

Zooming Spaces

| f | 38.900 | 58.836 | 90.501 |
|---|---|---|---|
| $d_9$ | 11.9263 | 5.3970 | 0.9392 |

Aspherical Coefficients
1st surface
$K=9.8812$
$A_4=-1.7604\times10^{-4}$
$A_6=-2.6124\times10^{-6}$
$A_8=4.3670\times10^{-8}$
$A_{10}=-2.1270\times10^{-10}$
2nd surface
$K=0$
$A_4=-2.6790\times10^{-4}$
$A_6=1.8401\times10^{-6}$
$A_8=-1.6242\times10^{-8}$
$A_{10}=2.4349\times10^{-10}$
3rd surface
$K=0$
$A_4=-2.4599\times10^{-4}$
$A_6=4.0107\times10^{-6}$
$A_8=-8.6776\times10^{-8}$
$A_{10}=6.3694\times10^{-10}$
5th surface
$K=0$
$A_4=-2.0608\times10^{-5}$
$A_6=-5.5658\times10^{-7}$
$A_8=1.0980\times10^{-8}$
$A_{10}=-1.4641\times10^{-10}$
9th surface
$K=0$
$A_4=-1.0211\times10^{-4}$
$A_6=2.2447\times10^{-6}$
$A_8=-2.5139\times10^{-7}$
$A_{10}=5.9558\times10^{-9}$
10th surface
$K=-21.8090$
$A_4=-1.8721\times10^{-4}$
$A_6=6.2311\times10^{-6}$
$A_8=-5.6663\times10^{-8}$
$A_{10}=1.7905\times10^{-10}$
11th surface
$K=0$
$A_4=8.3867\times10^{-5}$
$A_6=1.4404\times10^{-6}$
$A_8=7.8570\times10^{-9}$
$A_{10}=-1.2569\times10^{-10}$
12th surface
$K=0$
$A_4=7.7674\times10^{-5}$
$A_6=9.0257\times10^{-7}$
$A_8=-6.2499\times10^{-9}$
$A_{10}=1.0137\times10^{-10}$

EXAMPLE 3

$f = 39.800 \sim 72.999 \sim 117.769$
$F_{NO} = 5.572 \sim 9.477 \sim 14.526$
$f_B = 8.412 \sim 35.166 \sim 71.243$

| | | | |
|---|---|---|---|
| $r_1 = -11.1787$ | $d_1 = 0.6000$ | $n_{d1} = 1.70626$ | $\nu_{d1} = 49.99$ |
| $r_2 = -24.6144$ | $d_2 = 0.2000$ | | |
| $r_3 = 11.5646$(Aspheric) | $d_3 = 2.7000$ | $n_{d2} = 1.49700$ | $\nu_{d2} = 81.54$ |
| $r_4 = -11.1426$ | $d_4 = 0.2361$ | | |
| $r_5 = -9.9083$ | $d_5 = 0.7700$ | $n_{d3} = 1.60300$ | $\nu_{d3} = 65.44$ |
| $r_6 = -12.7012$ | $d_6 = 0.4047$ | | |
| $r_7 = \infty$ (Stop) | $d_7 = 0.6000$ | | |
| $r_8 = 90.7359$ | $d_8 = 0.7770$ | $n_{d4} = 1.74100$ | $\nu_{d4} = 52.64$ |
| $r_9 = 18.3699$ | $d_9 = 2.7717$ | $n_{d5} = 1.53996$ | $\nu_{d5} = 59.46$ |
| $r_{10} = -1652.9569$(Aspheric) | $d_{10}$ = (Variable) | | |
| $r_{11} = -18.3019$(Aspheric) | $d_{11} = 1.3211$ | $n_{d6} = 1.78590$ | $\nu_{d6} = 44.20$ |
| $r_{12} = -68.6109$ | $d_{12} = 0.6422$ | | |
| $r_{13} = 36.4765$(Aspheric) | $d_{13} = 3.6000$ | $n_{d7} = 1.84666$ | $\nu_{d7} = 23.78$ |
| $r_{14} = -151.7592$(Aspheric) | $d_{14} = 4.2960$ | | |
| $r_{15} = -9.0364$(Aspheric) | $d_{15} = 2.0897$ | $n_{d8} = 1.17250$ | $\nu_{d8} = 49.60$ |
| $r_{16} = -21.4648$ | | | |

Zooming Spaces

| f | 39.800 | 72.999 | 117.769 |
|---|---|---|---|
| $d_{10}$ | 9.2956 | 3.5626 | 0.9500 |

Aspherical Coefficients
3rd surface
K=0
$A_4=-2.0608\times10^{-5}$
$A_6=-5.5658\times10^{-7}$
$A_8=1.0980\times10^{-8}$
$A_{10}=-1.4641\times10^{-10}$
10th surface
K=0
$A_4=3.0023\times10^{-4}$
$A_6=1.4291\times10^{-6}$
$A_8=-6.6594\times10^{-9}$
$A_{10}=3.6308\times10^{-9}$
11th surface
K=0
$A_4=7.8620\times10^{-4}$
$A_6=-1.6924\times10^{-5}$
$A_8=2.3909\times10^{-7}$
$A_{10}=-9.2992\times10^{-10}$
13th surface
K=-38.1604
$A_4=-7.9297\times10^{-4}$
$A_6=7.3176\times10^{-6}$
$A_8=1.1123\times10^{-7}$
$A_{10}=-2.4001\times10^{-9}$
14th surface
K=0
$A_4=-3.9545\times10^{-4}$
$A_6=-1.0773\times10^{-7}$
$A_8=9.35077\ 110^{-8}$
$A_{10}=-8.8503\times10^{-10}$
15th surface
K=0
$A_4=-4.5758\times10^{-5}$
$A_6=-1.4240\times10^{-7}$
$A_8=-2.7511\times10^{-9}$
$A_{10}=4.3980\times10^{-10}$

EXAMPLE 4

$f = 39.770 \sim 75.170 \sim 121.000$
$F_{NO} = 5.348 \sim 9.014 \sim 13.401$
$f_B = 9.071 \sim 38.845 \sim 77.390$

| | | | |
|---|---|---|---|
| $r_1 = -11.8065$(Aspheric) | $d_1 = 0.6186$ | $n_{d1} = 1.78800$ | $\nu_{d1} = 47.37$ |
| $r_2 = -33.9970$(Aspheric) | $d_2 = 0.2000$ | | |
| $r_3 = 12.4545$(Aspheric) | $d_3 = 2.9529$ | $n_{d2} = 1.49700$ | $\nu_{d2} = 81.54$ |
| $r_4 = -15.8967$ | $d_4 = 3.1244$ | | |
| $r_5 = \infty$ (Stop) | $d_5 = 0.6000$ | | |
| $r_6 = 33.0850$ | $d_6 = 0.6424$ | $n_{d3} = 1.48749$ | $\nu_{d3} = 70.23$ |
| $r_7 = 91.9667$(Aspheric) | $d_7$ = (Variable) | | |
| $r_8 = -22.9955$(Aspheric) | $d_8 = 0.6201$ | $n_{d4} = 1.78590$ | $\nu_{d4} = 44.20$ |
| $r_9 = -42.3545$ | $d_9 = 0.5762$ | | |
| $r_{10} = -849.0712$(Aspheric) | $d_{10} = 3.6000$ | $n_{d5} = 1.84666$ | $\nu_{d5} = 23.78$ |
| $r_{11} = -36.0139$(Aspheric) | $d_{11} = 4.0019$ | | |
| $r_{12} = -8.9060$(Aspheric) | $d_{12} = 2.6533$ | $n_{d6} = 1.77250$ | $\nu_{d5} = 49.60$ |
| $r_{13} = -26.3850$ | | | |

Zooming Spaces

| f | 39.770 | 75.170 | 121.000 |
|---|---|---|---|
| $d_7$ | 10.1389 | 3.6929 | 0.9500 |

Aspherical Coefficients
1st surface
K=0
$A_4=1.5187\times10^{-5}$
$A_6=6.8236\times10^{-7}$
$A_8=-4.4159\times10^{-9}$
$A_{10}=7.2364\times10^{-10}$
2nd surface
K=0
$A_4=2.5035\times10^{-5}$
$A_6=8.3581\times10^{-7}$
$A_8=1.2126\times10^{-8}$
$A_{10}=4.4769\times10^{-10}$
3rd surface
K=0
$A_4=-2.0608\times10^{-5}$
$A_6=-5.5658\times10^{-7}$
$A_8=1.0980\times10^{-8}$
$A_{10}=-1.4641\times10^{-10}$
7th surface
K=0
$A_4=2.6402\times10^{-4}$
$A_6=1.4483\times10^{-6}$
$A_8=-1.0587\times10^{-8}$
$A_{10}=1.4041\times10^{-10}$
8th surface
K=0
$A_4=6.0100\times10^{-4}$
$A_6=-1.1632\times10^{-5}$
$A_8=1.0772\times10^{-7}$
$A_{10}=1.4071\times10^{-10}$
10th surface
K=-1.313×10$^{-5}$ $A_4=-7.0245\times10^{-4}$
$A_6=1.0971\times10^{-5}$
$A_8=2.2681\times10^{-8}$
$A_{10}=-1.5196\times10^{-9}$
11th surface
K=0
$A_4=-2.4274\times10^{-4}$
$A_6=9.5356\times10^{-7}$
$A_8=7.4495\times10^{-8}$
$A_{10}=-8.2675\times10^{-10}$
12th surface
K=0
$A_4=-2.2809\times10^{-5}$
$A_6=-3.0994\times10^{-7}$
$A_8=4.2226\times10^{-8}$
$A_{10}=-7.9776\times10^{-11}$

EXAMPLE 5

|  | f = 39.768~74.919~131.578<br>$F_{NO}$ = 5.479~9.575~15.979<br>$f_B$ = 8.563~34.843~77.201 | | |
|---|---|---|---|
| $r_1$ = −10.9549 | $d_1$ = 0.6000 | $n_{d1}$ = 1.78763 | $\nu_{d1}$ = 48.71 |
| $r_2$ = −20.5621 | $d_2$ = 0.2000 | | |
| $r_3$ = 11.8364<br>(Aspheric) | $d_3$ = 2.7000 | $n_{d2}$ = 1.49700 | $\nu_{d2}$ = 81.54 |
| $r_4$ = −11.2818 | $d_4$ = 0.2840 | | |
| $r_5$ = −10.0810 | $d_5$ = 0.7700 | $n_{d3}$ = 1.60300 | $\nu_{d3}$ = 65.44 |
| $r_6$ = −13.2539 | $d_6$ = 0.7774 | | |
| $r_7$ = ∞ (Stop) | $d_7$ = 0.6000 | | |
| $r_8$ = 63.4406 | $d_8$ = 0.7770 | $n_{d4}$ = 1.74100 | $\nu_{d4}$ = 52.64 |
| $r_9$ = 12.6523 | $d_9$ = 2.9298 | $n_{d5}$ = 1.53996 | $\nu_{d5}$ = 59.46 |
| $r_{10}$ = −271.0280<br>(Aspheric) | $d_{10}$ = (Variable) | | |
| $r_{11}$ = −17.4795<br>(Aspheric) | $d_{11}$ = 1.2929 | $n_{d6}$ = 1.78590 | $\nu_{d6}$ = 44.20 |
| $r_{12}$ = −43.2034 | $d_{12}$ = 0.5599 | | |
| $r_{13}$ = 48.3374<br>(Aspheric) | $d_{13}$ = 3.6000 | $n_{d7}$ = 1.84666 | $\nu_{d7}$ = 23.78 |
| $r_{14}$ = −62.1058<br>(Aspheric) | $d_{14}$ = 3.7829 | | |
| $r_{15}$ = −9.2296<br>(Aspheric) | $d_{15}$ = 1.5412 | $n_{d8}$ = 1.77250 | $\nu_{d8}$ = 49.60 |
| $r_{16}$ = −30.6787 | | | |

Zooming Spaces

| f | 39.768 | 74.919 | 131.578 |
|---|---|---|---|
| $d_{10}$ | 9.5307 | 3.7609 | 0.9500 |

Aspherical Coefficients
3rd surface
K=0
$A_4=-2.0608\times10^{-5}$
$A_6=-5.5658\times10^{-7}$
$A_8=1.0980\times10^{-8}$
$A_{10}=-1.4641\times10^{-10}$
10th surface
K=0
$A_4 2.7907\times10^{-4}$
$A_6=6.8624\times10^{-7}$
$A_8=6.8718\times10^{-8}$
$A_{10}=8.8697\times10^{-10}$ 11th surface
K=0
$A_4=7.6875\times10^{-4}$
$A_6=-1.6229\times10^{-5}$
$A_8=2.1758\times10^{-7}$
$A_{10}=-7.9528\times10^{-10}$
13th surface
K=−58.6725
$A_4=-7.7189\times10^{-4}$
$A_6=7.9895\times10^{-6}$
$A_8=7.2891\times10^{-8}$
$A_{10}=-1.8624\times10^{-9}$
14th surface
K=0
$A_4=-3.3632\times10^{-4}$
$A_6=-5.5749\times10^{-7}$
$A_8=8.7051\times10^{-8}$
$A_{10}=-8.1132\times10^{-10}$
15th surface
K=0
$A_4=-2.1892\times10^{-5}$
$A_6=-1.1898\times10^{-7}$
$A_8=1.2703\times10^{-8}$
$A_{10}=1.7994\times10^{-10}$

EXAMPLE 6

|  | f = 39.770~75.170~131.501<br>$F_{NO}$ = 5.100~8.719~15.252<br>$f_B$ = 8.004~35.674~79.705 | | |
|---|---|---|---|
| $r_1$ = −14.6904<br>(Aspheric) | $d_1$ = 0.6000 | $n_{d1}$ = 1.78800 | $\nu_{d1}$ = 47.37 |
| $r_2$ = −57.7042<br>(Aspheric) | $d_2$ = 0.2000 | | |
| $r_3$ = −11.2967 | $d_3$ = 2.7000 | $n_{d2}$ = 1.49700 | $\nu_{d2}$ = 81.54 |
| $r_4$ = −20.0740 | $d_4$ = 3.9132 | | |
| $r_5$ = ∞ (Stop) | $d_5$ = 0.6000 | | |
| $r_6$ = −96.7994 | $d_6$ = 0.5347 | $n_{d3}$ = 1.48749 | $\nu_{d3}$ = 70.23 |
| $r_7$ = −43.8506<br>(Aspheric) | $d_7$ = (Variable) | | |
| $r_8$ = −23.1667<br>(Aspheric) | $d_8$ = 0.8000 | $n_{d4}$ = 1.78590 | $\nu_{d4}$ = 44.20 |
| $r_9$ = −35.7022 | $d_9$ = 0.5434 | | |
| $r_{10}$ = −391.7831<br>(Aspheric) | $d_{10}$ = 4.1279 | $n_{d5}$ = 1.84666 | $\nu_{d5}$ = 23.78 |
| $r_{11}$ = −36.0565<br>(Aspheric) | $d_{11}$ = 3.8482 | | |
| $r_{12}$ = −9.6199<br>(Aspheric) | $d_{12}$ = 1.2000 | $n_{d6}$ = 1.75500 | $\nu_{d6}$ = 52.32 |
| $r_{13}$ = −35.3597 | | | |

Zooming Spaces

| f | 39.770 | 75.170 | 131.501 |
|---|---|---|---|
| $d_7$ | 11.6508 | 4.4266 | 0.9500 |

Aspherical Coefficients
1st surface
K=0
$A_4=-1.9609\times10^{-5}$
$A_6=3.3251\times10^{-6}$
$A_8=-1.4891\times10^{-7}$
$A_{10}=2.6099\times10^{-9}$ 2nd surface
K=0
$A_4=2.2433\times10^{-5}$
$A_6=3.7225\times10^{-6}$
$A_8=-1.4120\times10^{-7}$
$A_{10}=2.5915\times10^{-9}$
7th surface
K=0
$A_4=2.9241\times10^{-4}$
$A_6=-1.7508\times10^{-6}$
$A_8=2.7530\times10^{-7}$
$A_{10}=-3.7530\times10^{-9}$
8th surface
K=0
$A_4=5.4319\times10^{-4}$
$A_6=-9.5221\times10^{-6}$
$A_8=7.7241\times10^{-8}$
$A_{10}=6.2262\times10^{-10}$
10th surface
$K=-2.992\times10^{-4}$
$A_4=-6.5090\times10^{-4}$
$A_6=9.3598\times10^{-6}$
$A_8=5.8021\times10^{-10}$
$A_{10}=-8.0907\times10^{-10}$
11th surface
K=0
$A_4=-2.0147\times10^{-4}$
$A_6=3.3764\times10^{-7}$
$A_8=5.1496\times10^{-8}$
$A_{10}=-4.8229\times10^{-10}$
12th surface
K=0
$A_4=-3.9514\times10^{-6}$
$A_6=-3.2189\times10^{-7}$
$A_8=3.4497\times10^{-8}$
$A_{10}=-1.1515\times10^{-10}$

EXAMPLE 7

| | f = 39.770~75.170~141.120<br>$F_{NO}$ = 5.455~9.052~15.857<br>$f_B$ = 7.486~31.562~76.414 | | |
|---|---|---|---|
| $r_1$ = −11.2949 | $d_1$ = 0.6000 | $n_{d1}$ = 1.78800 | $v_{d1}$ = 47.37 |
| $r_2$ = −18.7763 | $d_2$ = 0.2000 | | |
| $r_3$ = 13.5863<br>(Aspheric) | $d_3$ = 2.7000 | $n_{d2}$ = 1.49700 | $v_{d2}$ = 81.54 |
| $r_4$ = −11.2611 | $d_4$ = 0.1732 | | |
| $r_5$ = −10.8412 | $d_5$ = 0.7700 | $n_{d3}$ = 1.60300 | $v_{d3}$ = 65.44 |
| $r_6$ = −16.4838 | $d_6$ = 2.3981 | | |
| $r_7$ = ∞ (Stop) | $d_7$ = 0.6000 | | |
| $r_8$ = 35.3535 | $d_8$ = 0.7770 | $n_{d4}$ = 1.74100 | $v_{d4}$ = 52.64 |
| $r_9$ = 8.6690 | $d_9$ = 3.2831 | $n_{d5}$ = 1.53996 | $v_{d5}$ = 59.46 |
| $r_{10}$ = −96.2277<br>(Aspheric) | $d_{10}$ = (Variable) | | |
| $r_{11}$ = −19.0022<br>(Aspheric) | $d_{11}$ = 1.0709 | $n_{d6}$ = 1.78590 | $v_{d6}$ = 44.20 |
| $r_{12}$ = −148.4968 | $d_{12}$ = 0.9054 | | |
| $r_{13}$ = 35.9954<br>(Aspheric) | $d_{13}$ = 3.9970 | $n_{d7}$ = 1.84666 | $v_{d7}$ = 23.78 |
| $r_{14}$ = −70.5993<br>(Aspheric) | $d_{14}$ = 3.6547 | | |
| $r_{15}$ = −9.5288 | $d_{15}$ = 1.2000 | $n_{d8}$ = 1.77250 | $v_{d8}$ = 49.60 |

-continued

| f = 39.770~75.170~141.120<br>$F_{NO}$ = 5.455~9.052~15.857<br>$f_B$ = 7.486~31.562~76.414 |
|---|
| (Aspheric)<br>$r_{16}$ = −32.0035 |

Zooming Spaces

| f | 39.770 | 75.170 | 141.120 |
|---|---|---|---|
| $d_{10}$ | 8.8791 | 3.6798 | 0.9500 |

Aspherical Coefficients

3rd surface

K=0
$A_4=-2.0608\times10^{-5}$
$A_6=-5.5658\times10^{-7}$
$A_8=1.0980\times10^{-8}$
$A_{10}=-1.4641\times10^{-10}$
10th surface
K=0
$A_4=1.8530\times10^{-4}$
$A_6=-1.0575\times10^{-6}$
$A_8=3.2020\times10^{-8}$
$A_{10}=2.4877\times10^{-9}$
11th surface
K=0
$A_4=7.3347\times10^{-4}$
$A_6=-1.4938\times10^{-5}$
$A_8=2.0899\times10^{-7}$
$A_{10}=-8.8459\times10^{-10}$
13th surface
K=−14.7077
$A_4=-7.4976\times10^{-4}$
$A_6=6.8260\times10^{-6}$
$A_8=6.4610\times10^{-8}$
$A_{10}=-1.6455\times10^{-9}$
14th surface
K=0
$A_4=-3.1363\times10^{-4}$
$A_6=-4.6138\times10^{-7}$
$A_8=6.5908\times10^{-8}$
$A_{10}=-6.1406\times10^{-10}$
15th surface
K=0
$A_4=-5.8257\times10^{-6}$
$A_6=3.5184\times10^{-7}$
$A_8=8.3828\times10^{-9}$
$A_{10}=9.1122\times10^{-11}$

EXAMPLE 8

| | | | |
|---|---|---|---|
| f = 39.769~75.165~141.534 | | | |
| $F_{NO}$ = 5.170~8.724~15.726 | | | |
| $f_B$ = 7.301~31.342~76.417 | | | |
| $r_1$ = −12.4545 | $d_1$ = 0.6000 | $n_{d1}$ = 1.78800 | $v_{d1}$ = 47.37 |
| $r_2$ = −21.6943 | $d_2$ = 0.2000 | | |
| $r_3$ = 13.5496 (Aspheric) | $d_3$ = 2.7000 | $n_{d2}$ = 1.49700 | $v_{d2}$ = 81.54 |
| $r_4$ = −11.9825 (Aspheric) | $d_4$ = 0.0000 | | |
| $r_5$ = −11.9250 | $d_5$ = 0.7700 | $n_{d3}$ = 1.61800 | $v_{d3}$ = 63.33 |
| $r_6$ = −19.0283 | $d_6$ = 3.0296 | | |
| $r_7$ = ∞ (Stop) | $d_7$ = 0.6000 | | |
| $r_8$ = 36.2518 | $d_8$ = 0.7770 | $n_{d4}$ = 1.77250 | $v_{d4}$ = 49.60 |
| $r_9$ = 11.1903 | $d_9$ = 3.1091 | $n_{d5}$ = 1.53996 | $v_{d5}$ = 59.46 |
| $r_{10}$ = −101.2160 (Aspheric) | $d_{10}$ = (Variable) | | |
| $r_{11}$ = −22.5859 (Aspheric) | $d_{11}$ = 0.8372 | $n_{d6}$ = 1.78590 | $v_{d6}$ = 44.20 |
| $r_{12}$ = 222.3871 | $d_{12}$ = 1.0570 | | |
| $r_{13}$ = 29.4642 (Aspheric) | $d_{13}$ = 3.6000 | $n_{d7}$ = 1.84666 | $v_{d7}$ = 23.78 |
| $r_{14}$ = −105.1623 (Aspheric) | $d_{14}$ = 3.8231 | | |
| $r_{15}$ = −9.5833 (Aspheric) | $d_{15}$ = 1.2000 | $n_{d8}$ = 1.77250 | $v_{d8}$ = 49.60 |
| $r_{16}$ = −30.6791 | | | |

Zooming Spaces

| f | 39.769 | 75.165 | 141.534 |
|---|---|---|---|
| $d_{10}$ | 9.0748 | 3.7535 | 0.9500 |

Aspherical Coefficients
3rd surface
K=0
$A_4$=−2.0608×10$^{-5}$
$A_6$=−5.5658×10$^{-7}$
$A_8$=1.0980×10$^{-8}$
$A_{10}$=−1.4641×10$^{-10}$
4th surface
K=0
$A_4$=−4.7932×10$^{-6}$
$A_6$=−1.5724×10$^{-7}$
$A_8$=8.0268×10$^{-9}$
$A_{10}$=−1.2339×10$^{-10}$
10th surface
K=0
$A_4$=2.0724×10$^{-4}$
$A_6$=−8.1876×10$^{-7}$
$A_8$=2.5244×10$^{-8}$
$A_{10}$=2.3640×10$^{-9}$
11th surface
K=0
$A_4$=6.4048×10$^{-4}$
$A_6$=−1.1422×10$^{-5}$
$A_8$=1.3099×10$^{-7}$
$A_{10}$=−4.0209×10$^{-10}$
13th surface
K=3.2819
$A_4$=−7.2041×10$^{-4}$
$A_6$=3.9678×10$^{-6}$
$A_8$=9.7572×10$^{-8}$
$A_{10}$=−1.5487×10$^{-9}$
14th surface
K=0
$A_4$=−2.9184×10$^{-4}$
$A_6$=−1.4884×10$^{-6}$
$A_8$=8.5990×10$^{-8}$
$A_{10}$=−7.3960×10$^{-10}$
15th surface
K=0
$A_4$=2.4059×10$^{-6}$
$A_6$=2.0338×10$^{-7}$
$A_8$=1.7533×10$^{-8}$
$A_{10}$=−2.6156×10$^{-12}$ Set out below are the values for conditions (1) to (3) in Examples 1 to 8.

| | (1) $|f_2|/f_T$ | (2) $\Delta X_{2T}/f_T$ | (3) $\beta_{2T}/\beta_{2W}$ |
|---|---|---|---|
| Example 1 | 0.246 | 0.474 | 3.327 |
| Example 2 | 0.276 | 0.474 | 2.396 |
| Example 3 | 0.171 | 0.534 | 2.959 |
| Example 4 | 0.177 | 0.565 | 3.193 |
| Example 5 | 0.145 | 0.522 | 3.309 |
| Example 6 | 0.166 | 0.545 | 3.307 |
| Example 7 | 0.122 | 0.488 | 3.548 |
| Example 8 | 0.123 | 0.488 | 3.559 |

The values of $|f_2|/f_T$, $\Delta X_{2T}/f_T$ and $\beta_{2T}/\beta_{2W}$ shown in the above table come within the following respective ranges. As a matter of course, the above exemplified zoom lens systems satisfy conditions (1) to (3); they have high zoom ratios and, nonetheless, are reduced in size during collapsing and at the telephoto ends, not to say nothing of at the wide-angle ends and well corrected for aberrations.

$$0.12 < |f_2|/f_T < 0.28$$

$$0.48 < \Delta X_{2T}/f_T < 0.57$$

$$2.30 < \beta_{2T}/\beta_{2W} < 3.60$$

The zoom lens system according to the present invention is of the type that the magnification changes continuously from the wide-angle end to the telephoto end. However, the present invention may be applicable to a zoom lens system whose magnification changes non-continuously at the wide-angle and telephoto ends or the wide-angle end, intermediate and telephoto end positions.

The zoom lens system of the present invention has a zoom ratio of 2 or greater and a telephoto end of 0.8 or less. The zoom lenses exemplified in the examples have a zoom ratio of 2.33 to 3.56 and a telephoto ratio of 0.70 to 0.82.

As can be predicted from the foregoing explanation, it is found according to the present invention that among solutions to a two-group zoom lens comprising a positive and a negative refracting power in order from the object side thereof, there is a proper arrangement where a refraction power profile is obtained, which enables the amount of zooming amount from the wide-angle end to the telephoto end to be reduced while a relatively high magnification is maintained. Correction of aberrations is ensured by finding a proper lens arrangement and how to make effective use of aspherical surfaces.

What is claimed is:

1. A zoom lens system comprising, in order from an object side thereof, a first lens group having positive refractive power and a second lens group having negative refracting power, wherein:

for zooming from a wide-angle end to a telephoto end of said system, each lens group moves toward said object side while a spacing between said first lens group and said second lens group is decreased, and said system has a zoom ratio of 2.3 or greater and a telephoto ratio which ranges from 0.70 to 0.82, and wherein;

a negative meniscus lens is located on a side of said first lens group nearest to the object side of the system, said negative meniscus lens being concave on its object side.

* * * * *